United States Patent
Bartfai-Walcott et al.

(10) Patent No.: US 10,404,547 B2
(45) Date of Patent: Sep. 3, 2019

(54) WORKLOAD OPTIMIZATION, SCHEDULING, AND PLACEMENT FOR RACK-SCALE ARCHITECTURE COMPUTING SYSTEMS

(71) Applicant: INTEL CORPORATION, Santa Clara, CA (US)

(72) Inventors: Katalin K. Bartfai-Walcott, El Dorado Hills, CA (US); Michael Christopher Woods, Dublin (IE); Giovani Estrada, Dublin (IE); John Kennedy, Clane (IE); Joseph Butler, Stamullen (IE); Slawomir Putyrski, Gdynia (PL); Alexander Leckey, Kilcock (IE); Victor M. Bayon-Molino, Maynooth (IE); Connor Upton, Leixlip (IE); Thijs Metsch, Cologne (DE)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 15/114,687

(22) PCT Filed: Feb. 24, 2015

(86) PCT No.: PCT/US2015/017228
§ 371 (c)(1),
(2) Date: Jul. 27, 2016

(87) PCT Pub. No.: WO2015/130645
PCT Pub. Date: Sep. 3, 2015

(65) Prior Publication Data
US 2016/0359683 A1    Dec. 8, 2016

Related U.S. Application Data

(60) Provisional application No. 61/945,597, filed on Feb. 27, 2014, provisional application No. 61/945,588, filed on Feb. 27, 2014.

(51) Int. Cl.
*G06F 15/173* (2006.01)
*H04L 12/24* (2006.01)
*H04L 12/26* (2006.01)

(52) U.S. Cl.
CPC ........ *H04L 41/147* (2013.01); *H04L 41/5009* (2013.01); *H04L 41/5054* (2013.01); *H04L 43/0817* (2013.01); *H04L 41/0883* (2013.01)

(58) Field of Classification Search
CPC .............. H04L 41/147; H04L 41/5054; H04L 43/0817; H04L 41/5009; H04L 41/0883
See application file for complete search history.

(56) References Cited

U.S. PATENT DOCUMENTS

2003/0154112 A1    8/2003    Neiman et al.
2004/0153835 A1    8/2004    Song et al.
(Continued)

FOREIGN PATENT DOCUMENTS

CN    103513983    1/2014
JP    2005-339528 A    12/2005
(Continued)

OTHER PUBLICATIONS

International Search Report and Written Opinion for Application No. PCT/US2015/017228, dated May 18, 2015, 12 pages.
(Continued)

*Primary Examiner* — Padma Mundur
(74) *Attorney, Agent, or Firm* — Barnes & Thornburg LLP

(57) ABSTRACT

Technologies for datacenter management include one or more computing racks each including a rack controller. The rack controller may receive system, performance, or health metrics for the components of the computing rack. The rack controller generates regression models to predict component lifespan and may predict logical machine lifespans based on
(Continued)

the lifespan of the included hardware components. The rack controller may generate notifications or schedule maintenance sessions based on remaining component or logical machine lifespans. The rack controller may compose logical machines using components having similar remaining lifespans. In some embodiments the rack controller may validate a service level agreement prior to executing an application based on the probability of component failure. A management interface may generate an interactive visualization of the system state and optimize the datacenter schedule based on optimization rules derived from human input in response to the visualization. Other embodiments are described and claimed.

19 Claims, 8 Drawing Sheets

(56) References Cited

U.S. PATENT DOCUMENTS

| | | | |
|---|---|---|---|
| 2007/0028147 A1* | 2/2007 | Huang | H04L 41/0604 714/43 |
| 2008/0177613 A1 | 7/2008 | Chan et al. | |
| 2009/0112531 A1 | 4/2009 | Sato et al. | |
| 2009/0172168 A1 | 7/2009 | Sonoda et al. | |
| 2011/0119525 A1* | 5/2011 | Muralimanohar | G06F 11/1438 714/15 |
| 2011/0179176 A1 | 7/2011 | Ravichandran et al. | |
| 2011/0320591 A1 | 12/2011 | Ozaki | |
| 2013/0138419 A1* | 5/2013 | Lopez | G06F 11/008 703/21 |
| 2015/0067415 A1* | 3/2015 | Miyamoto | G06F 11/076 714/704 |

FOREIGN PATENT DOCUMENTS

| | | |
|---|---|---|
| JP | 2008-176674 A | 7/2008 |
| JP | 2012-203750 A | 10/2012 |

OTHER PUBLICATIONS

Extended European search report dated Aug. 2, 2017 for European patent Application No. 15754492.5-1862, 3 pages.

Office Action dated Sep. 11, 2017 for Japanese patent Application No. 2016-546019 with translation, 9 pages.

First Office Action in Chinese Patent Application No. 20150006083.8, dated Sep. 4, 2018 (10 pages).

Second Office Action in Chinese Patent Application No. 20150006083.8, dated Apr. 3, 2019, including machine translation (12 pages).

* cited by examiner

WORKLOAD OPTIMIZATION, SCHEDULING, AND PLACEMENT FOR RACK-SCALE ARCHITECTURE COMPUTING SYSTEMS

CROSS REFERENCE TO RELATED APPLICATIONS

The present application is a national stage entry under 35 USC § 371(b) of International Application No. PCT/US2015/017228, which was filed Feb. 24, 2015. claims priority under 35 U.S.C. § 119(e) to U.S. Provisional Application Ser. No. 61/945,588, entitled "WORKLOAD OPTIMIZATION FOR RACK COMPUTING ARCHITECTURES," which was filed on Feb. 27, 2014, and to U.S. Provisional Application Ser. No. 61/945,597, entitled "GRAY BOX OPTIMIZATION FOR DATACENTER WORKLOAD SCHEDULING AND PLACEMENT," which was also filed on Feb. 27, 2014.

BACKGROUND

"Cloud" computing is a term often used to refer to the provisioning of computing resources as a service, usually by a number of computer servers that are networked together at a location remote from the location from which the services are requested. A cloud datacenter typically refers to the physical arrangement of servers that make up a cloud or a particular portion of a cloud. For example, servers can be physically arranged in the datacenter into rooms, groups, rows, and racks. A datacenter may have one or more "zones," which may include one or more rooms of servers. Each room may have one or more rows of servers, and each row may include one or more racks. Each rack may include one or more individual server nodes. Servers in zones, rooms, racks, and/or rows may be arranged into virtual groups based on physical infrastructure requirements of the datacenter facility, which may include power, energy, thermal, heat, and/or other requirements.

As the popularity of cloud computing grows, customers are increasingly requiring cloud service providers to include service-level agreements (SLAs) within the terms of their contracts. Such SLAs require cloud service providers to agree to provide the customer with at least a certain level of service, which can be measured by one or more metrics (e.g., system uptime, throughput, etc.). SLA goals (including service delivery objective (SDO) and service level objective (SLO) goals), efficiency targets, compliance objectives, energy targets including facilities, and other environmental and contextual constraints may also all be considered. In order to meet such agreements, it is important for cloud service providers to optimally allocate customer workloads among multiple physical servers and/or multiple nodes or resources on the same server. Typically, however, such allocation is based on what resources are available when a new or pending workload is generated and does not take into account the probability of hardware failure, which may cause a service provider to fail to satisfy an SLA.

Black box optimization has been applied in a number of domains, but there are still many situations where computational optimization has not been successfully applied due to the dynamic evolving nature of the problem and the need for human in-the-loop-planners and/or controllers. Conventional optimization algorithms may deal well with hard constraints, for example cutting and packing algorithms (e.g., determining the most profitable combination of physical goods stored in a standard shipping container). For example, mixed-integer problem solving is one representative example of a conventional algorithm that may deal with hard constraints. Black box optimization solutions may require a problem to be described algorithmically, generally without reference to contextual details of specific domains. Thus, these systems may not easily integrate user-defined knowledge or detect or account for dynamic changes. Additionally, black box optimization algorithms may not be directly accessible or viewable to all users.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
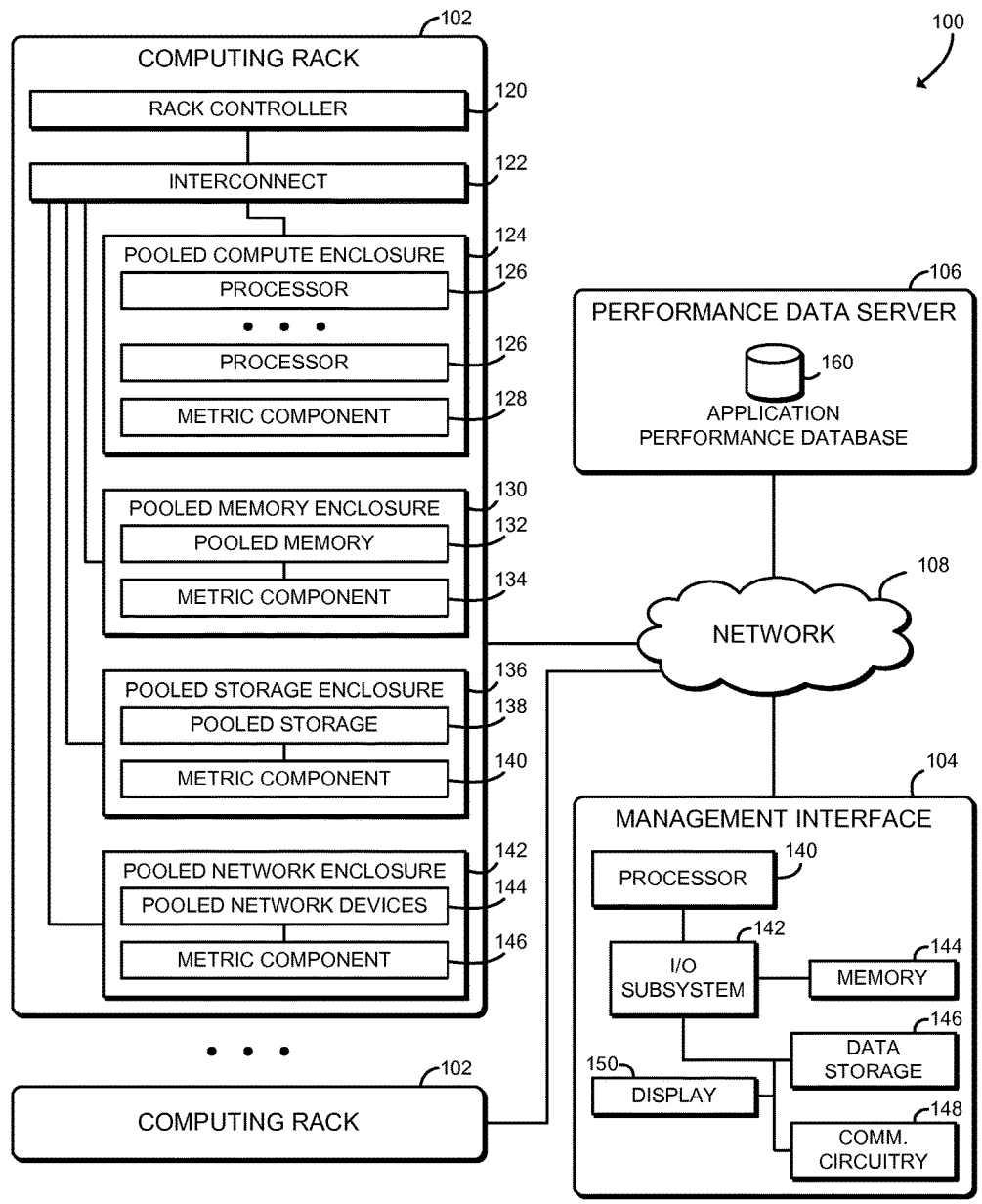
FIG. 1 is a simplified block diagram of at least one embodiment of a system for workload optimization, scheduling, and placement in a rack-scale computing architecture.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for workload optimization, scheduling, and placement includes several computing racks 102, a management interface 104, and a performance data server 106 in communication over a network 108. In use, a controller component of a computing rack 102 may monitor system metrics, performance metrics, or health metrics associated with hardware components of the computing rack 102. The controller component determines regression models for each hardware component that may be used to predict mean-time-to-failure values for each component. The controller component may also determine mean-time-to-failure values for each logical machine that is composed out of the hardware components of the computing rack 102. The controller component may manage the computing rack 102 or the system 100 based on the mean-time-to-failure values, for example generating appropriate alerts or alarms, scheduling maintenance sessions, or composing logical machines from components with similar remaining lifespans. Thus, the system 100 may improve the efficiency and reduce the frequency of maintenance sessions for the computing racks 102.

Additionally or alternatively, in use, a controller component of a computing rack 102 may transmit a description of an application that is to be executed to the performance data server 106. In response, the performance data server 106 transmits predicted workload data associated with that application description. The predicted workload data indicates usage patterns for various hardware components of the computing rack 102 associated with executing the described application. The performance data server 106 may determine the workload data based on historical workload data for that application received from many computing racks 102. Each computing rack 102 may monitor numerous performance metrics using hardware monitoring components. Based on the predicted workload data, the computing rack 102 determines a probability of hardware failure associated with the application (e.g., a probability that particular hardware components may fail while executing the application for a predetermined period of time). Based on the probability of failure, the computing rack 102 may schedule the application for execution by certain hardware components (e.g., components with the lowest probability of failure) or may verify one or more service level agreements associated with the application. Thus, a system operator (e.g., a cloud service provider, administrator, etc.) may match a customer's service-level agreement (SLA) with the expected lifetime of a hardware component under the load expected to be expressed by the customer's application before that application is executed.

Additionally or alternatively, in use, computing applications or other workloads may be distributed over any number of the computing racks 102 using available computing elements of the system 100 (e.g., compute nodes, memory, storage, or networking). The management interface 104 generates an interactive visualization of the current system state, for example including the current distribution and scheduling of workloads among the computing elements of the computing racks 102. The management interface 104 translates human input received in response to the visualization into a number of machine-readable user-defined optimization rules. The management interface 104 optimizes the datacenter workload (i.e., optimizes the placement and/or scheduling of workloads among the computing elements of the system 100) using the user-defined optimization rules well as pre-defined goals and constraints. After optimizing the workload, the management interface 104 refreshes the system state and repeats visualization and optimization. Thus, the system 100 may be a "gray box optimization" system that supports intuitive human interaction with optimization algorithms so that end users (including non-optimization experts) may impart contextual and tacit knowledge to the optimization algorithm to improve the solution developed. The system 100 may allow improved scheduling and placement of workload in a highly heterogeneous (i.e., disaggregated and/or modular) datacenter environment, with multiple internal (e.g., efficiency) and/or external (e.g., service delivery objective) constraints. Additionally, the system 100 may enable service providers to offer a wide range of service levels and templates to customers, due to the service provider's ability to optimally profit from all computing elements of the system 100 while managing operational cost tightly. Additionally, although described as being performed by the management interface 104, in some embodiments some or all of those functions may be performed by other elements of the system 100, such as one or more computing racks 102.

Each computing rack 102 may be embodied as a modular computing device that, alone or in combination with other computing racks 102, is capable of performing the functions described herein. For example, the computing rack 102 may be embodied as a chassis for rack-mounting modular computing units such as compute trays, storage trays, network trays, or traditional rack-mounted components such as servers or switches. As shown in FIG. 1, each computing rack 102 illustratively includes a rack controller 120 and an interconnect 122 coupled to a pooled compute enclosure 124, a pooled memory enclosure 130, pooled storage enclosure 136, and a pooled network enclosure 142. Of course, each computing rack 102 may include other or additional components, such as those commonly found in a server device (e.g., power distribution systems, cooling systems, or various input/output devices), in other embodiments.

It should be appreciated that, in some embodiments, each of the rack controller 120, the pooled compute enclosure 124, the pooled memory enclosure 130, the pooled storage enclosure 136, and the pooled network enclosure 142 may be embodied as a tray, expansion board, or blade, or any other form factor. In such embodiments, each enclosure may include any number of computing components, which may be allocated to an application or workload. It should be appreciated that in embodiments wherein the computing rack 102 includes trays, blades, or expansion boards, individual components may be replaced or upgraded and may be "hot swappable." For example, in some embodiments, the pooled compute enclosure 124 may be embodied as a CPU tray including multiple processors and/or processing/controlling circuits. In such embodiments, additional processing power may be added to the computing rack 102 by swapping out the pooled compute enclosure 124 with another pooled compute enclosure 124 including newer and/or more powerful processors.

The pooled compute enclosure 124 may be embodied as any modular computing unit such as a compute tray, expansion board, blade, chassis, or other modular unit. The pooled compute enclosure 124 may include one or more processors 126. For example, the pooled compute enclosure 124 may be embodied as a number of compute modules or nodes, each including one or more processors 126. Each processor 126 may be embodied as any type of processor capable of performing the functions described herein. For example, each processor may be embodied as a single or multi-core processor(s), digital signal processor, microcontroller, or other processor or processing/controlling circuit. The processors 126 may be heterogeneous; for example, some of the processors 126 may be embodied as high-performance server processors and others of the processors 126 may be embodied as low-powered processors suitable for higher density deployment. The pooled compute enclosure 124 may include a metric component 128. The metric component 128 may be embodied as any performance counter, performance monitoring unit, or other hardware monitor capable of generating, measuring, or otherwise capturing performance metrics of the processors 126 and/or other components of the pooled compute enclosure 124.

The pooled memory enclosure 130 may be embodied as any modular memory unit such as a memory tray, expansion board, blade, chassis, or other modular unit. The pooled memory enclosure 130 includes pooled memory 132. The pooled memory 132 may be embodied as any memory capable of being partitioned, allocated, or otherwise assigned for use by one or more of the processors 126 of the pooled compute enclosure 124. For example, the pooled memory 132 may be embodied as a pooled memory controller coupled to volatile or non-volatile memory, such as a large number of conventional RAM DIMMs. In operation, the pooled memory enclosure 130 may store various data and software used during operation of the computing rack 102 such as operating systems, virtual machine monitors, and user workloads. The pooled memory enclosure 130 may include a metric component 134. The metric component 134 may be embodied as any performance counter, performance monitoring unit, or other hardware monitor capable of generating, measuring, or otherwise capturing performance metrics of the pooled memory 132 and/or other components of the pooled memory enclosure 130.

Similarly, the pooled storage enclosure 136 may be embodied as any modular storage unit such as a storage tray, expansion board, blade, chassis, or other modular unit. The pooled storage enclosure 136 includes pooled storage 138. The pooled storage 138 may be embodied as any type of data storage capable of being partitioned, allocated, or otherwise assigned for use by one or more of the processors 126 of the pooled compute enclosure 124. For example, the pooled storage 138 may be embodied as one or more memory devices and circuits, memory cards, hard disk drives, solid-state drives, or other data storage devices. For example, the pooled storage 138 may be configured to store one or more operating systems to be initialized and/or executed by the computing rack 102. The pooled storage enclosure 136 may include a metric component 140. The metric component 140 may be embodied as any performance counter, performance monitoring unit, or other hardware monitor capable of generating, measuring, or otherwise capturing performance metrics of the pooled storage 138 and/or other components of the pooled storage enclosure 136.

Similarly, the pooled network enclosure 142 may be embodied as any modular network unit such as a network tray, expansion board, blade, chassis, or other modular unit. The pooled network enclosure 142 includes pooled network devices 144. The pooled network devices 144 may be embodied as any communication circuit, device, or collection thereof, capable of being partitioned, allocated, or otherwise assigned for use by one or more of the processors 126 of the pooled compute enclosure 124. For example, the pooled network devices 144 may be embodied as any number of network interface ports, cards, or switches. In some embodiments, the pooled network devices 144 may be capable of operating in a software-defined network (SDN). The pooled network devices 144 may be configured to use any one or more communication technology (e.g., wired or wireless communications) and associated protocols (e.g., Ethernet, Bluetooth®, Wi-Fi®, WiMAX, etc.) to effect such communication.

The pooled compute enclosure 124, pooled memory enclosure 130, pooled storage enclosure 136, and pooled network enclosure 142 are coupled to each other and to other computing racks 102 through the interconnect 122. The interconnect 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the computing elements of the computing rack 102. For example, in some embodiments, the interconnect 122 may be embodied as or include a silicon photonics switch fabric and a number of optical interconnects. Additionally or alternatively, in some embodiments, the interconnect 122 may be embodied as or include a top-of-rack switch.

The rack controller 120 may be embodied as any computing node or other computing device capable of performing workload management and orchestration functions for the computing rack 102 and otherwise performing the functions described herein. For example, the rack controller 120 may be embodied as one or more computer servers, embedded computing devices, managed network devices, managed switches, or other computation devices. In some embodiments the rack controller 120 may be incorporated or otherwise combined with the interconnect 122, for example in a top-of-rack switch.

As described above, in some embodiments the system 100 may include a management interface 104. A management interface 104 is configured to provide an interactive interface for a user to orchestrate, administer, or otherwise manage the system 100. The management interface 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. In some embodiments, the management interface 104 may be embodied as a distributed system, for example with some or all computational functions performed by the computing racks 102 and with user interface functions performed by the management interface 104. Additionally, in some embodiments, the management interface 140 may be embodied as a "virtual server" formed from multiple computing devices distributed across the network 108 and operating in a public or private cloud. Accordingly, although the management interface 104 is illustrated in FIG. 1 as embodied as a single server computing device, it should be appreciated that the management interface 104 may be embodied as multiple devices cooperating together to facilitate the functionality described below. As shown in FIG. 1, the management interface 104 illustratively includes a processor 140, an input/output subsystem 142, a memory 144, a data storage device 146, and communication circuitry 148. Of course, the management interface 104 may include other or additional components, such as those commonly found in a workstation (e.g., various input/output devices), in other embodiments. Additionally, in some embodiments, one or more of the illustrative components may be incorporated in, or otherwise form a portion of, another component. For example, the memory 144, or portions thereof, may be incorporated in the processor 140 in some embodiments.

The processor 140 may be embodied as any type of processor capable of performing the functions described herein. The processor 140 may be embodied as a single or multi-core processor(s), digital signal processor, microcontroller, or other processor or processing/controlling circuit. Similarly, the memory 144 may be embodied as any type of volatile or non-volatile memory or data storage capable of performing the functions described herein. In operation, the memory 144 may store various data and software used during operation of the management interface 104 such as operating systems, applications, programs, libraries, and drivers. The memory 144 is communicatively coupled to the processor 140 via the I/O subsystem 142, which may be embodied as circuitry and/or components to facilitate input/output operations with the processor 140, the memory 144, and other components of the management interface 104. For example, the I/O subsystem 142 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 142 may form a portion of a system-on-a-chip (SoC) and be incorporated, along with the processor 140, the memory 144, and other components of the management interface 104, on a single integrated circuit chip.

The data storage device 146 may be embodied as any type of device or devices configured for short-term or long-term storage of data such as, for example, memory devices and circuits, memory cards, hard disk drives, solid-state drives, or other data storage devices. The communication circuitry 148 of the management interface 104 may be embodied as any communication circuit, device, or collection thereof, capable of enabling communications between the management interface 104, the computing racks 102, and/or other remote devices over the network 108. The communication circuitry 148 may be configured to use any one or more communication technology (e.g., wired or wireless communications) and associated protocols (e.g., Ethernet, Bluetooth®, Wi-Fi®, WiMAX, etc.) to effect such communication.

The management interface 104 further includes a display 150. The display 150 of the management interface 104 may be embodied as any type of display capable of displaying digital information such as a liquid crystal display (LCD), a light emitting diode (LED), a plasma display, a cathode ray tube (CRT), or other type of display device. As further described below, the display 150 may present an interactive graphical user interface for management of the system 100.

As described above, in some embodiments the system 100 may include a performance data server 106. The performance data server 106 is configured to maintain an application performance database 160 that associates workload data with particular application descriptions. The performance data server 106 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. The performance data server 106 may include components and devices commonly found in a server or similar computing device, such as a processor, an I/O subsystem, a memory, a data storage device, communication circuitry, and/or other peripheral devices. Those individual components of the performance data server 106 may be similar to the corresponding components of the computing racks 102 and/or the management interface 104, the description of which is applicable to the corresponding components of the performance data server 106 and is not repeated herein so as not to obscure the present disclosure. Additionally, in some embodiments, the performance data server 106 may be embodied as a "virtual server" formed from multiple computing devices distributed across the network 108 and operating in a public or private cloud. Accordingly, although the performance data server 106 is illustrated in FIG. 1 as embodied as a single server computing device, it should be appreciated that the performance data server 106 may be embodied as multiple devices cooperating together to facilitate the functionality described below.

As discussed in more detail below, the computing racks 102, the management interface 104, and the performance data server 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Although illustrated as a rack-scale architecture (RSA) system, in other embodiments the system 100 may be embodied as a traditional datacenter, computing cluster, or other collection of computing machines. For example, the system 100 may include a number of rack-mounted or freestanding compute nodes in communication over a network, a network switching fabric, a storage area network, a cloud controller, or other typical datacenter components. Additionally, in some embodiments, one or more of the illustrative components may be incorporated in, or otherwise form a portion of, another component. For example, the one or more of the pooled memory enclosures 130, or portions thereof, may be incorporated in one or more of the pooled compute enclosures 124 in some embodiments. Similarly, although each computing rack 102 is illustrated as including a single pooled compute enclosure 124, pooled memory enclosure 130, pooled storage enclosure 136, and pooled network enclosure 142, it should be understood that each computing rack 102 may include any number and/or combination of those modular enclosures.

Figure 2:
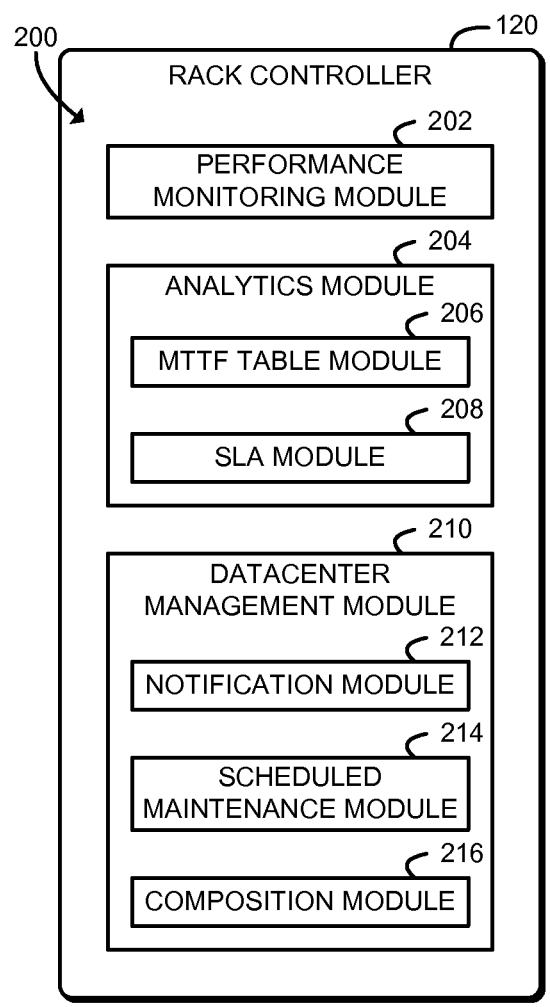
FIG. 2 is a simplified block diagram of at least one embodiment of an environment of a rack controller of the system of FIG. 1.

Referring now to FIG. 2, in the illustrative embodiment a rack controller 120 establishes an environment 200 during operation. The illustrative environment 200 includes a performance monitoring module 202, an analytics module 204, and a datacenter management module 210. The various modules of the environment 200 may be embodied as hardware, firmware, software, or a combination thereof. For example, each of the modules, logic, and other components of the environment 200 may form a portion of, or otherwise be established by, a processor or other hardware components of the rack controller 120. As such, in some embodiments, one or more of the modules of the environment 200 may be embodied as a circuit or collection of electrical devices (e.g., a performance monitoring circuit, an analytics circuit, etc.). Additionally or alternatively, in some embodiments part or all of the environment 200 may be established by other entities of the system 100, such as by one or more pooled compute enclosures 124 or other components of the computing racks 102.

The performance monitoring module 202 is configured to receive metrics associated with hardware components of the computing rack 102. The hardware components may include compute resources, memory resources, storage resources, and/or network resources. As described further below, the metrics may include system metrics, performance metrics, and/or health metrics. In some embodiments, the performance monitoring module 202 may also be configured to receive performance indicators associated with services or other computing applications executed by the computing rack 102.

The analytics module 204 is configured to determine regression models for each hardware component of the computing rack 102 based on the associated metrics. The analytics module 204 is further configured to determine a mean-time-to-failure (MTTF) value for each hardware component based on the associated regression model and determine a MTTF value for the logical machine composed out of the hardware components. The mean-time-to-failure may be based on quality of service guarantees or other service delivery objectives established by one or more service level agreements. The analytics module 204 may maintain one or more MTTF tables containing the MTTF values for hardware components and/or logical machines. Those functions of the analytics module 204 may be performed by one or more sub-modules, for example by an MTTF table module 206 or a service level agreement (SLA) module 208.

The datacenter management module 210 is configured to manage the computing rack 102 and/or the system 100 based on the calculated mean-time-to-failure values. The datacenter management module 210 may be configured to notify a user of the mean-time-to-failure value for each hardware component, for example by creating alerts or alarms. The datacenter management module 210 may be configured to determine a future time for maintenance sessions based on the mean-time-to-failure value associated with each logical machine. The datacenter management module 210 may be configured to compose hardware components into logical machines based on the associated mean-time-to-failure values. For example, the datacenter management module 210 may be configured to compose logical machines including hardware components having a similar mean-time-to-failure value. Those functions of the datacenter management module 210 may be performed by one or more sub-modules, for example by a notification module 212, a scheduled maintenance module 214, or a composition module 216.

Figure 3:
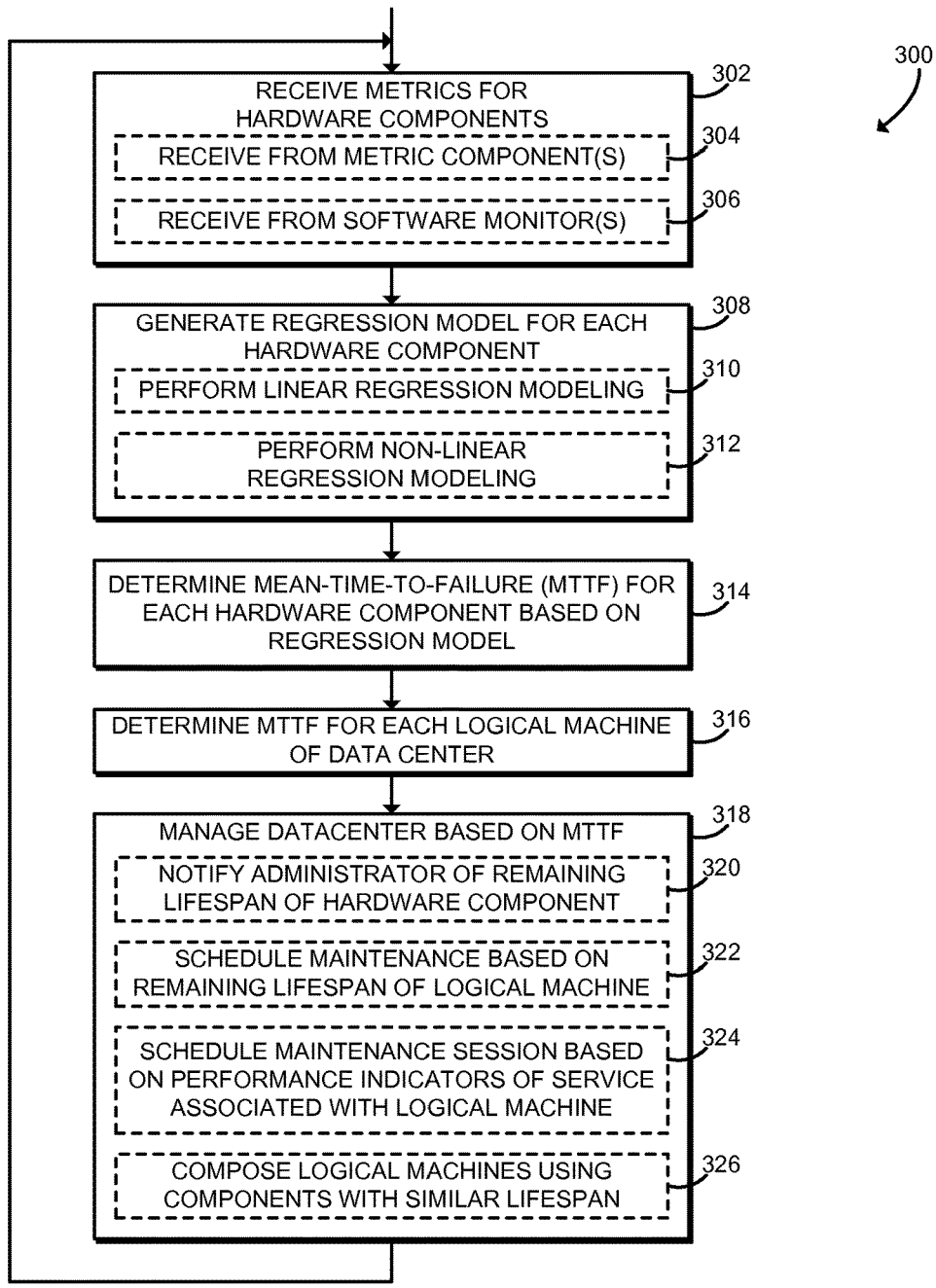
FIG. 3 is a simplified flow diagram of at least one embodiment of a method for datacenter management that may be executed by the rack controller of FIGS. 1 and 2.

Referring now to FIG. 3, in use, the rack controller 120 may execute a method 300 for datacenter management. The method 300 begins in block 302, in which the rack controller 120 receives metrics for one or more hardware components of the computing rack 102. The metrics may be embodied as any type of data that enables component lifespan prediction. The metrics may include system metrics (e.g., manufacturing specifications and values directly measurable on the component such as temperature or power) or health and performance metrics (e.g., metrics relating to functionality of the component such as bandwidth, latency, or throughput). The metrics may be compiled into subcomponent log files and then transmitted to the rack controller 120 for processing and storage.

Illustratively, for the pooled compute enclosure 124 the system metrics may be embodied as full CPU specifications, performance counter monitor data (e.g., data on instructions retired by the processors 126, processor 126 frequency, on-board memory controller bandwidth, cache miss statistics, etc.), temperature data, power cycle counters, total hours of use counters, or other metrics. Health metrics for the pooled compute enclosure 124 may be embodied as kernel panic counters, processor exception counters, or other metrics. Performance metrics for the pooled compute enclosure 124 may be embodied as instructions-per-second counters (e.g., MIPS) or other metrics.

Illustratively, for the pooled memory enclosure 130, the system metrics may be embodied as full specifications, temperature data, power cycle counters, total hours of use counters, memory access counters, or other metrics. Health metrics for the pooled memory enclosure 130 may be embodied as parity error counters or other metrics. Performance metrics for the pooled memory enclosure 130 may be embodied as observed memory bandwidth or other metrics.

Illustratively, for the pooled storage enclosure 136, the system metrics may be embodied as storage type including full specifications (e.g., solid-state drive, hard disk drive, cache size, etc.), read/write counters, I/O operations per second (IOPS) counters, total hours of use counters, temperature data, or other metrics. Health metrics for the pooled storage enclosure 136 may be embodied as block fault counters, page fault counters, seek time data, latency data, or other metrics. Performance metrics for the pooled storage enclosure 136 may be embodied as random read throughput data or other metrics.

Illustratively, for the pooled network enclosure 142, the system metrics may be embodied as network technology type including full specifications (e.g., 100 Mbps, 1000 Mbps, etc.), temperature data, power cycle counters, total hours of use counters, or other metrics. The health metrics for the pooled network enclosure 142 may be embodied as data reception and transmission counters, transmission and reception error counters, and other metrics. Performance metrics for the pooled network enclosure 142 may be embodied as bandwidth data or other metrics.

In some embodiments, in block 304, the rack controller 120 may receive the metrics from one or more dedicated hardware monitoring components. For example, the rack controller 120 may receive the metrics from the metric component 128 of the pooled compute enclosure 124, the metric component 134 of the pooled memory enclosure 130, the metric component 140 of the pooled storage enclosure 136, or the metric component 146 of the pooled network enclosure 146. The rack controller 120 may also receive metrics from one or more firmware modules, embedded firmware devices, manageability engines, or other out-of-band management components of the computing rack 102. In some embodiments, in block 306, the rack controller 120 may receive the metrics from one or more software monitors. Collecting metrics from software monitors may require modifying or otherwise coordinating with other software executed by the computing rack 102.

In block 308, the rack controller 120 generates a regression model for each component of the computing rack 102 that may be used to estimate an associated remaining hardware lifespan. The regression model may be generated using the equation y=Xb, where y is the response vector (e.g., either health or performance metrics), X is the matrix of observations (e.g., the system metrics), and b is a vector representing an estimate of the fitting parameter.

In some embodiments, in block 310, the rack controller 120 performs linear regression modeling. The rack controller 120 may use a robust multi-linear regression approach. The rack controller 120 may iteratively reweigh the least squares with a matrix factorization (accomplished using QR decomposition) with a bi-square weighting function. Thus, the linear regression modeling may be efficiently calculated at a large scale as required by large datacenters.

In some embodiments, in block 312, the rack controller 120 performs non-linear regression modeling. The rack controller 120 uses a generalized linear model (GLM). The rack controller 120 uses a probit link and a binomial distribution for generating logistic regressions. The non-linear regression modeling may be preferred when the root-mean-square errors in the linear case are considerable.

In block 314, the rack controller 120 determines a mean-time-to-failure (MTTF) value for each hardware component based on the regression model. The regression model may be used to predict future changes to the health or performance of the hardware components (e.g., by predicting a future value of a health metric or performance metric). The predicted metrics may be compared to predefined thresholds such as manufacture specifications or service level agreement (SLA) requirements (e.g., quality of service requirements, service level objectives, or other requirements). The point in time when the predicted metric and the predefined thresholds intersect represents predicted component failure, and the distance to this time is the mean time to failure (MTTF). The rack controller 120 may store the MTTF values for each component into one or more data tables, databases, or other data sources.

In block 316, the rack controller 120 determines a MTTF for each logical machine of the datacenter. As described above, the components of the computing rack 102 may be composed into one or more logical machines which may be used to execute computing applications or otherwise provide services. The lifespan of a logical machine may be determined as the shortest lifespan of its constituent components. For example, for a logical machine composed of compute, storage, network, and memory resources, the rack controller 120 may determine the MTTF for the logical machine as the minimum of the MTTFs of the compute, storage, network, and memory components composed into that logical machine.

In block 318, the rack controller 120 may manage the computing rack 102 and/or the system 100 based on the calculated MTTF values. In some embodiments, in block 320, the rack controller 120 may notify an administrator or other user of the remaining lifespan of a hardware component. A component may be marked for replacement when minor errors start to appear too frequently or when the performance of the component falls below what the SLA requires. The rack controller 120 may, for example, set one or more alarms or alerts to notify an administrator of likely component failure. For example, the rack controller 120 may generate an alarm identifying a component to be replaced before a certain time to avoid failure, or generate an alert identifying a component that will require maintenance within a certain time. Thus, the rack controller 120 may allow administrators to identify subcomponents that need replacement and understand the impact of utilization on a logical machine.

In some embodiments, in block 322, the rack controller 120 may schedule maintenance based on the remaining lifespan of a logical machine. Failing logical machines may undergo a virtual reassembly process when the failing component is replaced. During reassembly, the logical machine may be frozen and thus the delivered quality of service or SLA may be seriously degraded. Scheduling maintenance of logical machines to replace components before their predicted MTTF may help prevent unplanned downtime. In some embodiments, in block 324 the rack controller 102 may further schedule maintenance based on performance indicators of the service or other computing application being executed by each logical machine. The rack controller 120 may, for example, schedule a maintenance session for a logical machine when the service supported by the logical machine is at its least busy period.

In some embodiments, in block 326, the rack controller 120 may compose logical machines using hardware components with similar remaining lifespans. During an allocation process, the rack controller 120 may query pools of compute, storage, network, or memory components to assemble the logical machines. The rack controller 120 may query one or more data sources for MTTF values and incorporate the predicted failure dates for each component in the selection process. By composing logical machines from components with similar lifespans, multiple components may be replaced in each scheduled maintenance session, which may reduce repeated maintenance sessions and otherwise improve quality of service. After managing the computing rack 102 and/or datacenter, the method 300 loops back to block 302 to continue monitoring metrics for the hardware components.

Figure 4:
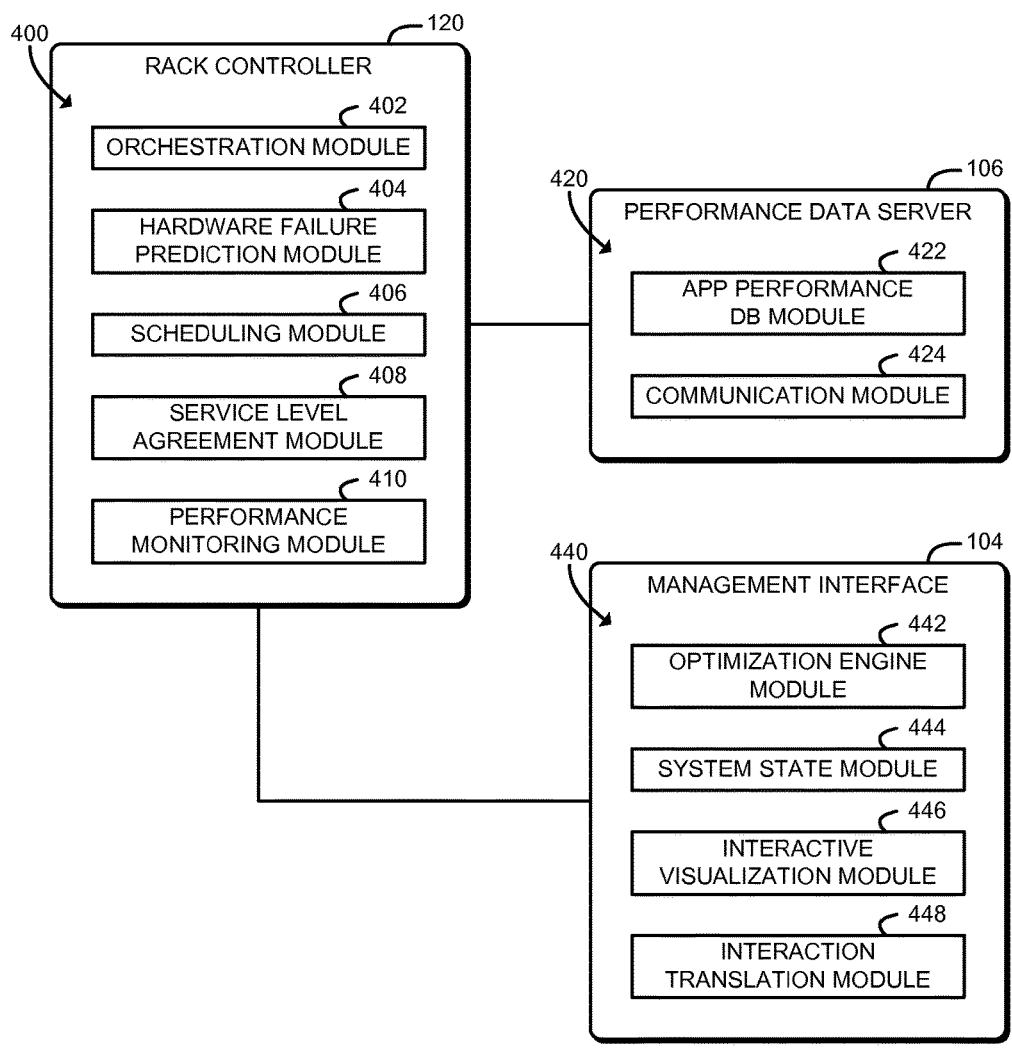
FIG. 4 is a simplified block diagram of at least one embodiment of several environments of the system of FIG. 1.

Referring now to FIG. 4, in some embodiments, the rack controller 120 may additionally or alternatively establish an environment 400 during operation. The illustrative environment 400 includes an orchestration module 402, a hardware failure prediction module 404, a scheduling module 406, a service level agreement module 408, and a performance monitoring module 410. The various modules of the environment 400 may be embodied as hardware, firmware, software, or a combination thereof. For example, each of the modules, logic, and other components of the environment 400 may form a portion of, or otherwise be established by, a processor or other hardware components of the rack controller 120. As such, in some embodiments, one or more of the modules of the environment 400 may be embodied as a circuit or collection of electrical devices (e.g., an orchestration circuit, a hardware failure prediction circuit, etc.).

The orchestration module 402 is configured to receive a description of an application that may be executed by the computing rack 102, transmit the application description to the performance data server 106, and in response receive predicted workload data associated with the application from the performance data server 106. As described below, the predicted workload data is indicative of a usage pattern of one or more hardware components of the computing rack 102 (e.g., compute resources, memory resources, storage resources, or network resources), and may be generated or otherwise sourced from many other computing racks 102.

The hardware failure prediction module 404 is configured to determine a probability of failure of one or more hardware components of the computing rack 102 based on the predicted workload data. The hardware failure prediction module 404 may also consider other data, such as locally stored usage history data associated with the hardware components. The hardware failure prediction module 404 may limit its determination of probability to hardware components that are available to execute the application.

The scheduling module 406 is configured to identify hardware components of the computing rack 102 that are available to execute the application and select an available hardware component to execute the computing application based on the probability of failure of each of the available hardware components.

The service level agreement module 408 is configured to determine whether a service level agreement (SLA) associated with the computing application is satisfied by the probability of failure of the hardware component. The service level agreement module 408 may determine whether the probability that the hardware component will fail while executing the application within the pre-defined period satisfies one or more SLA goals associated with the application (e.g., uptime, reliability, or other service delivery objective (SDO) and service level objective (SLO) goals).

The performance monitoring module 410 is configured to collect hardware performance metrics associated with the hardware components of the computing rack 102, for example from the hardware metric components 128, 134, 140, 146. The performance monitoring module 410 is configured to determine workload data (similar to the predicted workload data received from the performance data server 106) based on the hardware performance metrics, for example by generating one or more normalized waveforms based on the performance metrics. The performance monitoring module 410 is configured to identify the current application(s) executed by the computing rack 102 and associate application description(s) of those application(s) with the workload data. The performance monitoring module 410 is configured to transmit the workload data and the application description(s) of the current application(s) to the performance data server 106.

Still referring to FIG. 4, in the illustrative embodiment the performance data server 106 establishes an environment 420 during operation. The illustrative environment 420 includes an application performance database module 422 and a communication module 424. The various modules of the environment 420 may be embodied as hardware, firmware, software, or a combination thereof. For example, each of the modules, logic, and other components of the environment 420 may form a portion of, or otherwise be established by, a processor or other hardware components of the performance data server 106. As such, in some embodiments, one or more of the modules of the environment 420 may be embodied as a circuit or collection of electrical devices (e.g., an application performance database circuit or a communication circuit).

The application performance database module 422 is configured to retrieve workload data associated with an application description, for example from the application performance database 160. As described above, the workload data may be historical workload data received from one or more computing racks 102. The application performance database module 422 is further configured to determine whether the historical workload data associated with the application description exists and, if not, generate estimated workload data for the application description. The application performance database module 422 may later replace estimated workload data with the historical workload data received from a computing rack 102.

The communication module 424 is configured to receive historical workload data and associated descriptions of computing application(s) from the computing racks 102. The communication module 424 is further configured to receive queries from the computing racks 102 including an application description and to transmit the workload data associated with the application description to the computing racks 102 in response to the queries. Thus, the workload data may be disseminated from the performance data server 106 to many computing racks 102.

Still referring to FIG. 4, in the illustrative embodiment the management interface 104 establishes an environment 440 during operation. The illustrative environment 440 includes an optimization engine module 442, a system state module 444, an interactive visualization module 446, and an interaction translation module 448. The various modules of the environment 440 may be embodied as hardware, firmware, software, or a combination thereof. For example, each of the modules, logic, and other components of the environment 440 may form a portion of, or otherwise be established by, the processor 140 or other hardware components of the management interface 104. As such, in some embodiments, one or more of the modules of the environment 440 may be embodied as a circuit or collection of electrical devices (e.g., an orchestration circuit, a hardware failure prediction circuit, etc.). In some embodiments, part or all of the environment 440 may be established by other entities of the system 100, such as the rack controller 120 or other components of the computing racks 102.

The optimization engine module 442 is configured to optimize a datacenter schedule of the system 100 based on one or more optimization constraints. The optimization constraints may be based on predefined goals, constraints, or other rules (e.g., from one or more service-level agreements associated with the system 100) and may be based on user-define goals, constraints, or other rules, as described below. The optimization engine module 442 may be configured to adjust the system state of the datacenter based on the optimized datacenter schedule, for example by communicating the optimized datacenter schedule to one or more rack controllers 120 of the system 100.

The system state module 444 is configured to receive sensor data from a sensor network of the system 100. The sensor network includes several sensors to measure the state of the system 100 and its components, including usage and performance data, power consumption data, temperature data, and other state data. The sensor network may include, for example, the metric components 128, 134, 140, 146 of the computing racks 102.

The interactive visualization module 446 is configured to generate an interactive visualization representative of the state of the system 100 and receive human input in response to the interactive visualization. The interactive visualization may incorporate the system state determined by the system state module 444 as well as any previous optimizations of the datacenter schedule generated by the optimization engine module 442.

The interaction translation module 448 is configured to translate the human input received in response to the interactive visualization into one or more machine-readable goals, constraints, or other rules for optimizing workload scheduling of the system 100. As described above, those user-defined rules may be interpreted by the optimization engine module 442 when further optimizing the datacenter scheduling.

Figure 5:
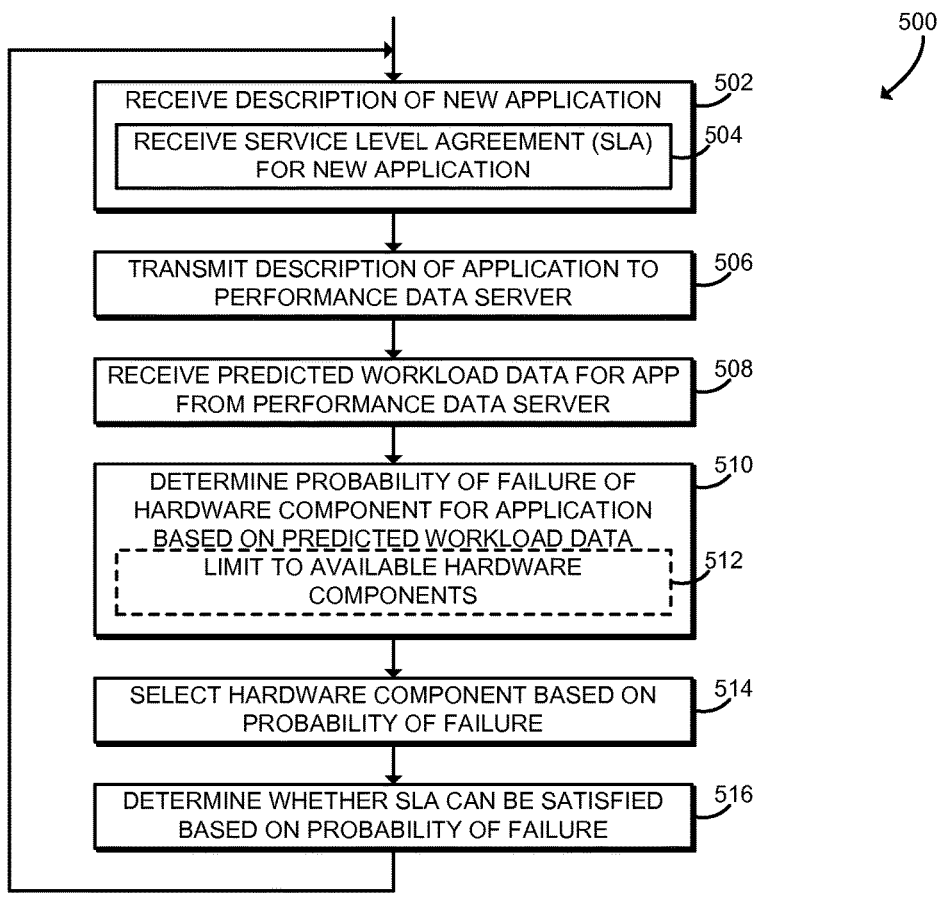
FIG. 5 is a simplified flow diagram of at least one embodiment of a method for workload optimization, scheduling, and placement that may be executed by a rack controller of FIGS. 1 and 4.

Referring now to FIG. 5, in use, the rack controller 120 may execute a method 500 for optimization, scheduling, and placement of datacenter workloads. The method 500 begins in block 502, in which the rack controller 120 receives a description of a new application to be executed (e.g., run, initialized, processed, etc.) by the computing rack 102. The application description may be received (e.g., via any suitable input device or process) from a user (e.g., an administrator, a developer, a customer, a subscriber, etc.) of the computing rack 102. For example, in some embodiments, the rack controller 120 may receive an application description corresponding to an application (e.g., a particular web server, database, financial transaction server, etc.) for a workload that a customer desires to have run (e.g., executed, initialized, processed, etc.) by the computing rack 102. The application description may describe the identity and/or other unique properties or characteristics of that particular application. In some embodiments, the application description data may be embodied as a description of the application and its constituent services formatted according to the OASIS Topology and Orchestration Specification for Cloud Applications (TOSCA). The application description may, for example, be embodied as one or more service templates that describe the topology or other structure of the application as well as one or more orchestration methods used to create, terminate, and/or otherwise manage the application. Of course, it should be appreciated that any other format may be used to describe the application and its constituent services.

In block 504 the rack controller 120 may receive one or more service level agreements (SLAs) associated with the new application. An SLA defines the level of service to be provided by the computing rack 102 to the customer. The SLA may include one or more goals (such as service delivery objective (SDO) and service level objective (SLO) goals), efficiency targets, compliance objectives, energy targets including facilities, and other environmental or contextual constraints. Similar to the application description, the SLA may be received from a user (e.g., an administrator, a developer, a customer, a subscriber, etc.) of the computing rack 102. In general, the SLA defines goals and constraints for delivery of the application (e.g., uptime goals for a web server), rather than particular performance or quality constraints for elements of the computing racks 102 (e.g., reliability goals for individual disks of the pooled storage 138).

In block 506, the rack controller 120 transmits the application description to the performance data server 106. As described further below in connection with FIG. 6, the performance data server 106 looks up historical performance data associated with the application description that may have been provided by other computing racks 102.

In block 508, the rack controller 120 receives predicted workload data associated with the application description from the performance data server 106. The predicted workload data corresponds to a predicted hardware usage pattern associated with the application for which the application description data (e.g., the TOSCA application description) was sent. In some embodiments, the predicted workload data may be embodied as historical average load data, such as an average observed machine workload corresponding to the application. That is, the historical average load data may include data indicative of the previous impact that execution (e.g., running, initialization, processing, etc.) of the application had on the computational or other resources of the computing rack 102 (or other computing racks 102). For example, the predicted workload data may be indicative of the historical processor, memory, storage, or network load caused by execution of the application. In some embodiments, the predicted workload data may be embodied as the average of historical workload data for the application. In some embodiments, the predicted workload data may be embodied as a collection of waveforms describing the temporal load as amplitude, frequency, and phase via a Fourier transform.

In block 510, the rack controller 120 determines a probability of failure for one or more hardware components of the computing rack 102 during execution of the application, based on the predicted workload data. The rack controller 120 may, for example, analyze the received predicted workload data and local component-specific metric data corresponding to one or more components of the computing rack 102 (e.g., historical usage data associated with one or more components of the computing rack 102). The rack controller 120 may determine the probability of failure by solely analyzing the received predicted workload data or by analyzing the received predicted workload data in combination with any other data or metric suitable for determining if and when a component may fail. For example, the rack controller 120 may additionally analyze statistical data on component failure rates that may be provided by the manufacture, through testing, or otherwise determined. As an illustration, the predicted workload data may indicate that particular application is storage-intensive. In that example, the rack controller 120 may determine the probability of failure for each disk, storage module, or other component of the pooled storage enclosure 136 based on historical usage data of that component, the predicted workload, and statistical data on the failure rate of that component. In some embodiments, the probability of failure of a component may be expressed as a percentage of the chance that the component will fail within a pre-defined (e.g., a reference, etc.) period. For example, the probability of failure may be expressed as the probability that a component will fail sometime within the next four weeks. It should be appreciated the probability of failure and/or the period of time for failure may be expressed in any other way. In some embodiments, in block 512 the rack controller 120 may limit calculation of probability to available components of the computing rack 102. For example, the rack controller 102 may determine the probability of failure for processors 126 of the pooled compute enclosure 124 that have not been assigned to any task.

In block 514, the rack controller 120 selects one or more hardware components for execution of the application based on the probability of failure. For example, the rack controller 120 may generate a list of the available components to execute (e.g., run, initialize, process, service, etc.) the application, and then rank those components from least probable to experience a failure within the pre-defined period of time to the component most probable to experience a failure within that same period of time. The rack controller 120 may select the hardware component least probable to experience a failure for execution of the application. For example, the rack controller 120 may identify available processors 126, rank those available processors 126 by probability of failure, and select the available processor 126 having the lowest probability of failure. Additionally or alternatively, the rack controller 120 may select the hardware components based on one or more additional criteria, such as available resources, proximity, security, or other criteria. After selecting one or more components, an orchestrator of the computing rack 102 may create or otherwise initialize execution of the application using the selected components.

In block 516, the rack controller 120 determines whether the SLA requested for the application can be satisfied by the probability of failure. The rack controller 120 may determine whether one or more available components of the computing rack 102 are capable of meeting or are otherwise within a threshold metric of meeting one or more goals, constraints, or other requirements of the SLA. In doing so, the rack controller 120 may validate, before allocation of the application and/or workload, that the one more components of the computing rack 102 selected to execute the application and/or workload are capable of meeting the SLA. After validating the SLA, the method 500 loops back to block 502 to continue processing descriptions of new applications.

Figure 6:
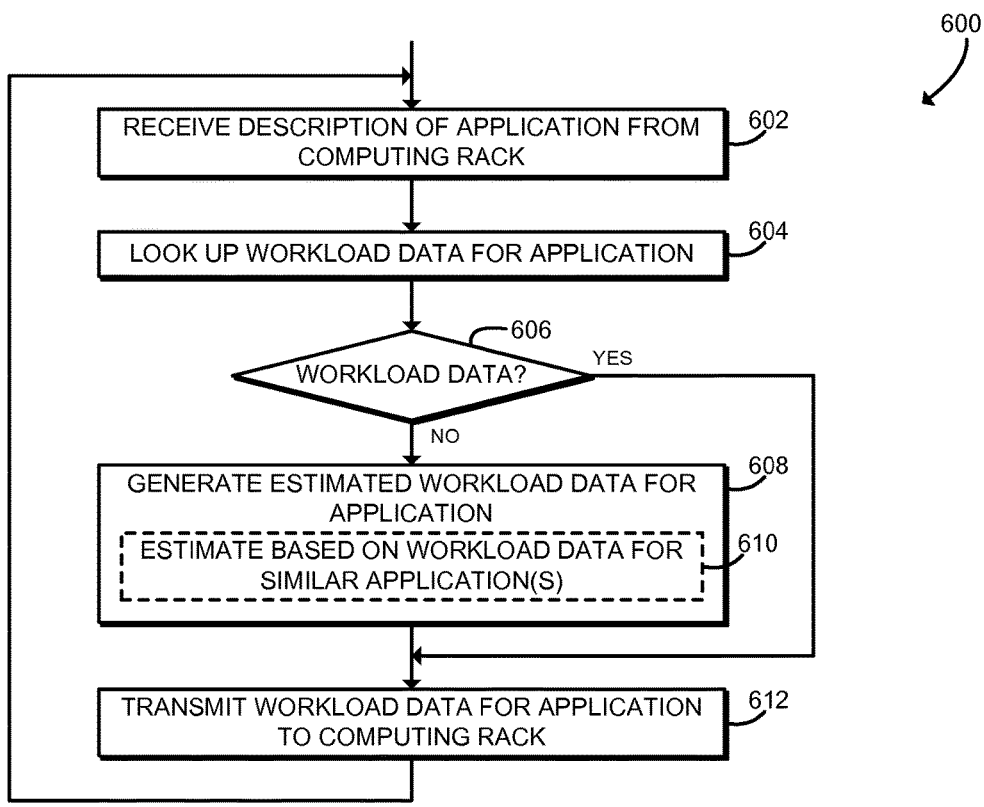
FIG. 6 is a simplified flow diagram of a method for predicted workload data retrieval that may be executed by a performance data server of FIGS. 1 and 4.

Referring now to FIG. 6, in use, the performance data server 106 may execute a method 600 for predicted workload data retrieval. The method 600 begins in block 602, in which the performance data server 106 receives a description of an application to be executed by a computing rack 102. As described above, the application description data may be embodied as a description of the application and its constituent services formatted according to the OASIS Topology and Orchestration Specification for Cloud Applications (TOSCA). The application description may, for example, be embodied as one or more service templates that describe the topology or other structure of the application as well as one or more orchestration methods used to create, terminate, and/or otherwise manage the application.

In block 604, the performance data server 106 looks up stored historical workload data associated with the application description. For example, the performance data server 106 may look up the workload data in the application performance database 160, which may be indexed by application name and/or other identifiers associated with the application. In block 606, the performance data server 106 determines whether historical workload data exists for the application description. If so, the method 600 branches ahead to block 612, described below. If workload data does not exist, the method 600 advances to block 608.

In block 608, the performance data server 106 generates estimated workload data for the application description. For example, the performance data server 106 may generate an estimation of the average workload data for an unknown application, or supply default workload data. The performance data server 106 may store the estimated workload data for future use, for example in the application performance database 160. In some embodiments, in block 610, the performance data server 106 may generate the estimated workload data for an unknown application based on the historical workload data of similar applications. For example, if the application description is associated with an unknown web server, the performance data server 106 may generate the estimated workload data by combining or averaging workload data for known web servers (e.g., workload data for Apache 2 and nginx).

In block 612, the performance data server 106 transmits the workload data to the computing rack 102. The performance data server 106 may transmit, for example, historical workload data determined as described above in connection with block 604 or estimated workload data determined as described above in connection with block 608. As described above in connection with FIG. 5, the computing rack 102 may analyze the workload data to predict the probability of hardware component failure associated with the application. After transmitting the workload data, the method 600 loops back to block 602 to continue receiving application descriptions from computing racks 102.

Figure 7:
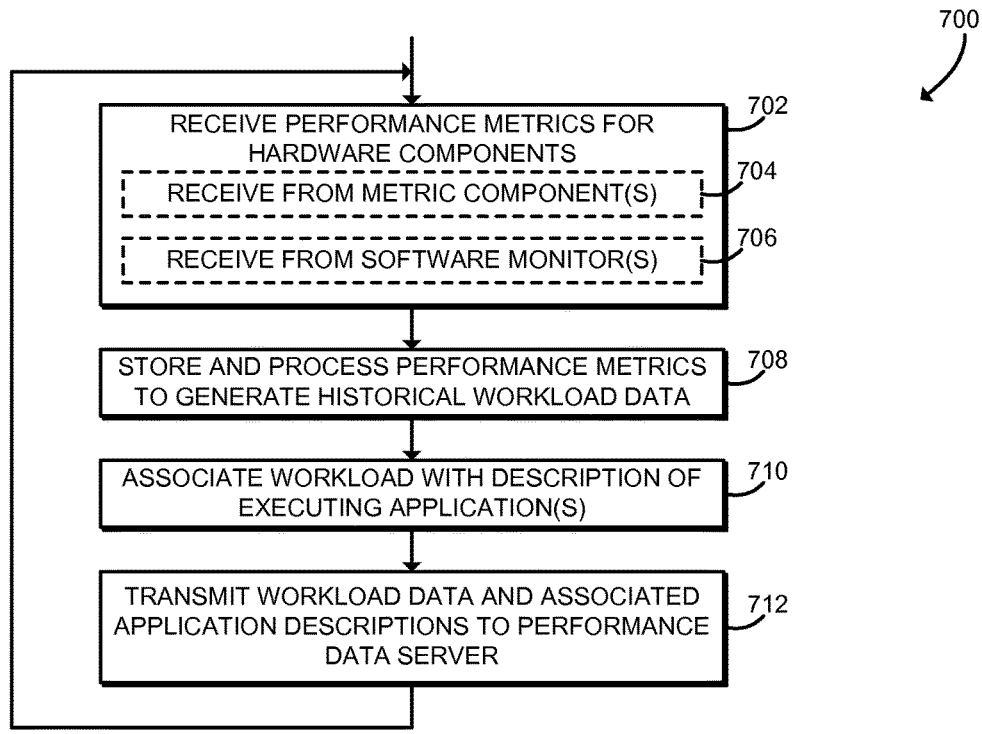
FIG. 7 is a simplified flow diagram of at least one embodiment of a method for performance monitoring that may be executed by the rack controller of FIGS. 1 and 4.

Referring now to FIG. 7, in use, the rack controller 120 may execute a method 700 for performance monitoring of datacenter workloads. The method 700 begins in block 702, in which the rack controller 120 receives performance metrics for one or more hardware components of the computing rack 102. The performance metrics may be embodied as any type of data that describes a type (e.g., storage type, processor type, etc.), a performance metric (e.g., seek time, parity and error frequency, etc.), an operational characteristic (e.g., temperature, etc.), a utilization metric (e.g., total usage time, total number of accesses, etc.), and/or any other type of metric that can be generated and/or captured for each of the hardware components of the computing rack 102. For example, the performance metrics may be embodied as binary data representing a set of low-level samples of load or usage aspects of particular hardware components.

Illustratively, for the pooled compute enclosure 124 the performance metrics may be embodied as performance counter monitor data (e.g., data on instructions retired by the processors 126, processor 126 frequency, on-board memory controller bandwidth, cache miss statistics, etc.), kernel panic or processor exception counters, temperature data, power cycle counters, total hours of use counters, or other metrics. For the pooled memory enclosure 130, the performance metrics may be embodied as observed memory bandwidth, parity and error counters, memory frequency, memory access counters, temperature data, power cycle counters, total hours of use counters, or other metrics. For the pooled storage enclosure 136, the performance metrics may be embodied as storage type (e.g., solid-state drive, hard disk drive, cache size, etc.), reads per second, global reads counter, writes per second, global writes counter, total I/O operations per second (IOPS), IOPS, block fault counter, page fault counter, seek time data, latency data, temperature data, power cycle counters, total hours of use counters, or other metrics. For the pooled network enclosure 142, the performance metrics may be embodied as connections per second, data transmitted, data received, temperature data, power cycle counters, total hours of use counters, or other metrics.

In some embodiments, in block 704, the rack controller 120 may receive the performance metrics from one or more dedicated hardware monitoring components. For example, the rack controller 120 may receive the performance metrics from the metric component 128 of the pooled compute enclosure 124, the metric component 134 of the pooled memory enclosure 130, the metric component 140 of the pooled storage enclosure 136, or the metric component 146 of the pooled network enclosure 146. In some embodiments, in block 706, the rack controller 120 may receive the performance metrics from one or more software monitors. Collecting performance metrics from software monitors may require modifying or otherwise coordinating with other software executed by the computing rack 102.

In block 708, the rack controller 120 stores and processes the performance metrics to generate historical workload data. For example, the rack controller 120 may store the performance metric data received from each of the components of the computing rack 102 in a local hardware/performance database. The workload data may represent performance metrics data for one hour of average usage. For example, the workload data may be embodied as a collection of normalized waveforms describing the temporal load as amplitude, frequency, and phase. The rack controller 120 may generate the workload data, for example, by applying a Fourier transform to the performance metrics data.

In block 710, the rack controller 120 associates the workload data with a description of one or more applications currently being executed (e.g., run, initialized, processed, serviced, etc.) by the computing rack 102. Thus, the rack controller 120 may associate each application with the hardware resources (e.g., compute, memory, storage, or network resources) required to execute that application. The application description may describe the identity and/or other unique properties or characteristics of that particular application. In some embodiments, the application description data may be embodied as a description of the application and its constituent services formatted according to the OASIS Topology and Orchestration Specification for Cloud Applications (TOSCA). The application description may, for example, be embodied as one or more service templates that describe the topology or other structure of the application as well as one or more orchestration methods used to create, terminate, and/or otherwise manage the application. Of course, it should be appreciated that any other format may be used to describe the application and its constituent services.

In block 712, the rack controller 120 transmits the workload data and the associated application description(s) to the performance data server 106. In some embodiments, the rack controller 120 may transmit the combined and/or matched data to the performance data server 106 as a function of a pre-defined (e.g., a reference) time interval. For example, in some embodiments, the rack controller 120 may transmit the combined and/or matched data to the performance data server 106 every hour. As described below in connection with FIG. 8, the performance data server 106 may store and process the workload data. After transmitting the workload data and associated application description, the method 700 loops back to block 702 to continue monitoring performance metrics.

Figure 8:
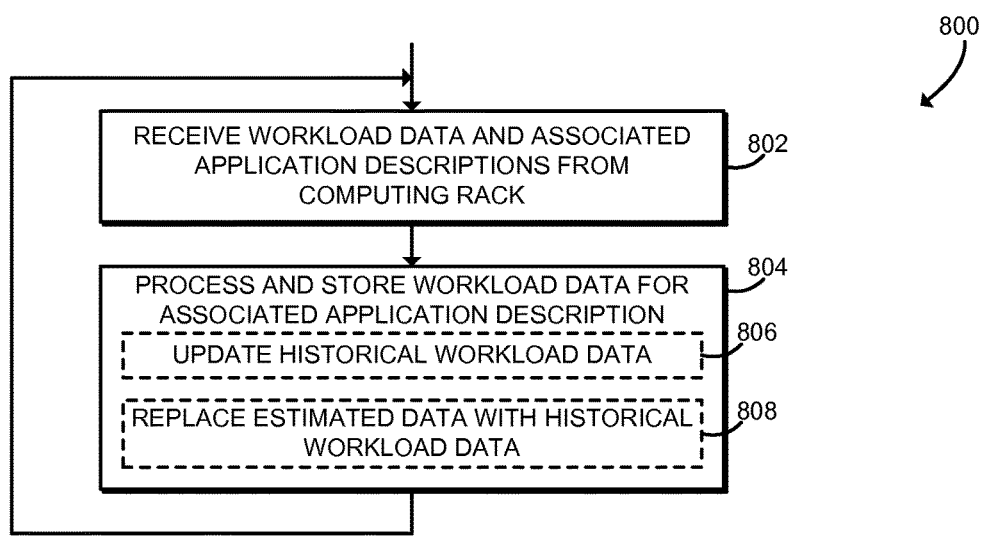
FIG. 8 is a simplified flow diagram of a method for performance data management that may be executed by the performance data server of FIGS. 1 and 4.

Referring now to FIG. 8, in use, the performance data server 106 may execute a method 800 for performance data management. The method 800 begins in block 802, in which the performance data server 106 receives workload data and one or more associated application descriptions from a computing rack 102. As described above in connection with FIG. 7, the workload data represents measured load on one or more hardware components of the computing rack 102 during execution of the associated application or applications. The workload data may be embodied as, for example, a collection of normalized waveforms indicative of one hour of average usage of the various hardware components of the computing rack 102. As described above, the application description data may be embodied as a description of the application and its constituent services formatted according to the OASIS Topology and Orchestration Specification for Cloud Applications (TOSCA). The application description may, for example, be embodied as one or more service templates that describe the topology or other structure of the application as well as one or more orchestration methods used to create, terminate, and/or otherwise manage the application.

In block 804, the performance data server 106 processes and stores the workload data associated with the application description. For example, the performance data server 106 may store the workload data and associated application descriptions in the application performance database 160. After being stored, the workload data may be provided to the computing racks 102 to predict hardware component usage of the associated applications as described above in connection with FIGS. 5 and 6. Because the workload data may originate from many different computing racks 102, the application performance database 160 may be described as a "crowdsourced" database. In some embodiments, in block 806 the performance data server 106 may update the historical workload data for the associated application description in the application performance database 160. For example, the performance data server 106 may update average values or update normalized waveforms that describe the temporal load as amplitude, frequency, and phase. In some embodiments, in block 808, the performance data server 106 may replace estimated data in the application performance database 160 with historical workload data received from the computing rack 102. As described above in connection with block 608 of FIG. 6, for certain unknown applications or other applications without historical workload data, the performance data server 106 may generate estimated workload data. By replacing estimated workload data with historical workload data provided by the computing racks 102, the performance data server 106 prioritizes measured workload data over estimated workload data. After storing the workload data, the method 800 loops back to block 802 to continue receiving workload data and associated application descriptions from the computing racks 102.

Figure 9:
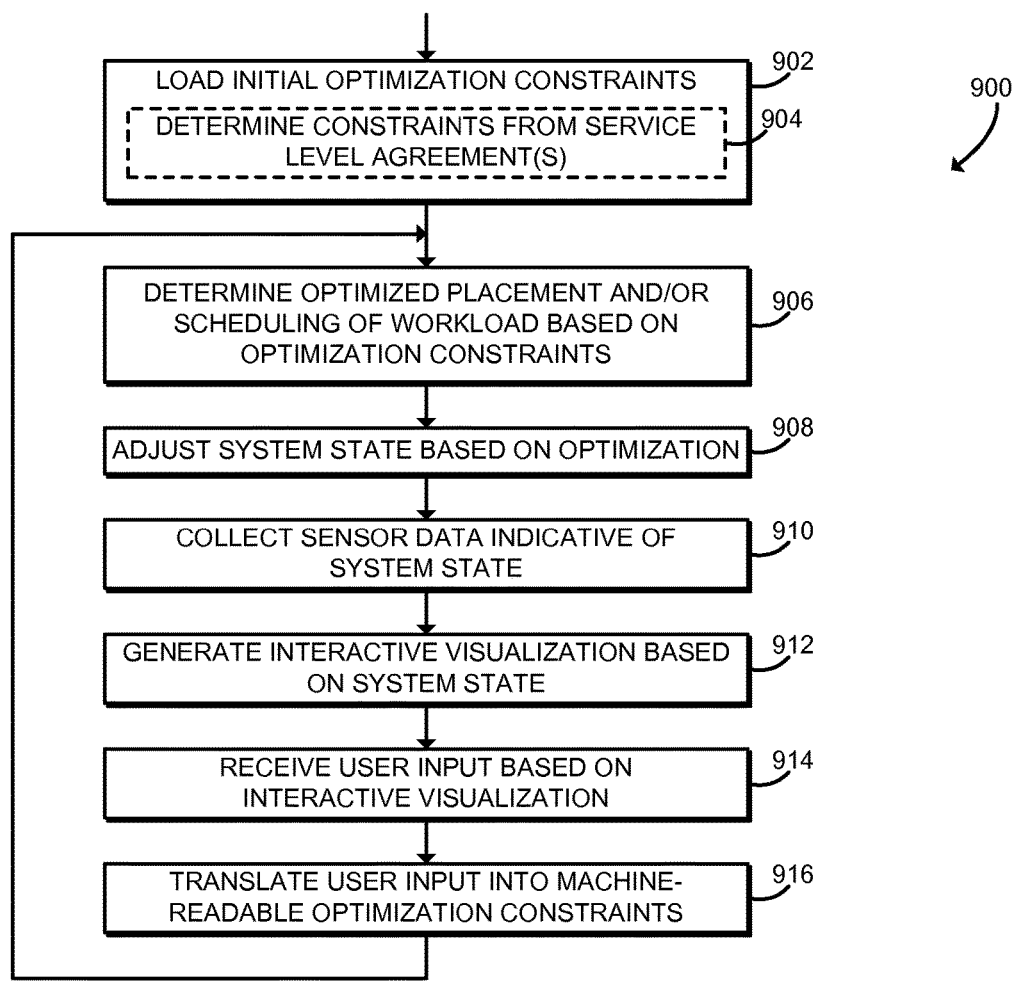
FIG. 9 is a simplified flow diagram of a method for optimizing workload scheduling and placement that may be executed by the system of FIGS. 1 and 4.

Referring now to FIG. 9, in use, the management interface 104 may execute a method 900 for optimizing workload scheduling and placement. Although illustrated as being executed by the management interface 104, it should be understood that in some embodiments some or all of the functions of the method 900 may be executed by other elements of the system 100 including by one or more of the computing racks 102 and/or rack controllers 120. The method 900 begins in block 902, in which the management interface 104 loads one or more initial optimization constraints and configures the optimization engine module 442 with those constraints. The initial optimization constraints may be embodied as one or more predefined constraints and/or goals. In some embodiments, in block 904, the management interface 104 may determine the initial constraints based on one or more service level agreements (SLAs). For example, the initial optimization constraints may correspond to one or more service level objectives (SLOs) such as level of performance, uptime/reliability, or other quantitative measures, or to one or more service delivery objectives (SDOs) such as data location, security standards, or other SDOs. As another example, the initial optimization constraints may include efficiency targets, compliance objectives, energy targets including facilities, and other environmental and contextual constraints. The initial optimization constraints may be provided using a graphical user interface (GUI) configuration module.

In block 906, the management interface 104 determines optimized placement and/or scheduling of workload for the system 100 based on the optimization constraints provided to the optimization engine module 442. The optimization constraints may be the initial optimization constraints or may be based on user-defined rules or constraints, as described further below. Accordingly, the optimization engine module 442 integrates formal, predefined descriptions of a problem space with human inputs to create solution joint cognitive systems with optimal results. The optimization engine module 442 may be embodied as an automated program that uses an algorithm to solve a complex problem. In particular, the optimization engine module 442 may determine an optimal system state for the system 100, including an optimal placement and/or schedule for workloads on the various computing elements of the system 100. The optimization engine module 442 may use any optimization algorithm, including a stochastic optimization algorithm. In particular, the illustrative optimization engine module 442 may evaluate "soft constraints" when optimizing datacenter schedules (e.g., plans for placement and/or scheduling of workloads). For example, consider an incoming element of workload that may benefit from two different configuration options that are not entirely compatible, for example, (1) platform feature options available on certain computing elements of the system 100 and (2) data-transfer-rate configuration options. In that example, the relative benefit to execution of the workload may not be precisely known for both options; the benefit may be in a range. In that example, that benefit may be established or modeled based on statistics, in which case multiple scenarios may be selected in order to inform the model of an order of preference. Of course, that is a highly simplistic example, and at scale the optimization may incorporate aspects of cost, flexibility, component lifetime, reputation, service level assurance (SLA), and risk.

The optimization engine module 442 attempts to provide optimal solutions based on system state, including system parameters that describe the configuration of the computing elements of the system 100 as well as the compute workload. The optimization engine module 442 may use optimization constraints to adjust a fitness function used to evaluate the performance of the system 100. The optimization engine module 442 may need to produce results very rapidly in order to be usable, for example when engaged in "what-if" scenario planning. Rapid results may require a meta-heuristic approach. Thus, the optimization engine module 442 may use forms of stochastic optimization such as harmony search, simulated annealing, or other stochastic optimization algorithms to provide results rapidly. Thus, the management interface 104 may capture run-time data on the system state, process the run-time data to gather statistical evidence of run-time behavior, and combine this statistical evidence with optimization techniques such as the aforementioned harmony search in order to establish a reliable model (knowledge base) of behavior of the system 100.

In block 908, the management interface 104 adjusts the state of the system 100 based on the output of the optimization engine module 442. For example, the management interface 104 may assign or reassign computing elements of the system 100 to different workloads, transfer workloads to different computing elements or computing racks 102, adjust the scheduling of workloads, or perform any other configuration as described by the optimized datacenter schedule determined by the optimization engine module 442. The management interface 104 may adjust the state of the system 100 by communicating with the rack controllers 120 and/or other orchestration elements of the computing racks 102.

In block 910, the management interface 104 collects sensor data indicative of the state of the system 100. The management interface 104 may collect data on the system state using a sensor network of the system 100. The system state may include any data concerning the workload of the system 100 including resource utilization data, capacity data, thermal data, energy consumption data, or other data. The sensor network may include the metric components 128, 134, 140, 146 of the computing racks 102 and/or other sensors, monitors, or monitoring components. The management interface 104 may store the system state data in a system state database within the system 100.

In block 912, the management interface 104 generates and displays an interactive visualization to represent the state of the system 100. The interactive visualization may be used to both represent the current state of the system 100, including any previous optimizations generated by the optimization engine module 442, and allow the user to impart information to the system 100 through intuitive interaction. The initial output of the optimization algorithm may be presented to the user or users, who may then impart information to the system 100 through simple interactions, for example using a prompt-based "wizard" interface to specify new inputs. The interactive visualization may be embodied as any visualization representative of the system state of the system 100, including the current placement and/or scheduling of workloads on the various computing elements of the system 100. The interactive visualization may be embodied as part or all of a datacenter operator and/or supervisor's management interface (a "dashboard"), and may provide a highly intuitive representation of workload placement and/or scheduling histories. Additionally, the interactive visualization may provide interactive recommendations that allow the user to experiment with interventions and examine their implications, with the optimization algorithm being automatically updated in response to the interventions. In some embodiments, the interactive visualization may allow the user to select among several potential scenarios generated by the optimization engine. Multiple users may collaboratively interact with the system 100 using the interactive visualization to dynamically impart their expert contextual knowledge. For example, datacenter and network operators, development-operations teams, middleware integrators, and facilities operators may all have knowledge to impart through the interactive visualization. The interactive visualization may be presented locally, for example using the display 150 of the management interface 104 or another console interface of the system 100, or remotely, for example using a web page or remote management console.

In block 914, the management interface 104 receives user input based on the interactive visualization. For example, as further described above, the management interface 104 may receive one or more user responses to a wizard interface generated by the interactive visualization.

In block 916, the management interface 104 translates the user input into one or more machine-readable user-defined rules for the optimization engine module 442. The machine-readable rules may be embodied as any rule that configures, constrains, or otherwise adjusts the operation or output of the optimization engine module 442. Generating the machine-readable rules based on user input allows the user to input soft and/or statistical constraints that the user may be aware of, based on the user's tacit knowledge, but which may not be measurable by the sensor network. Thus, the user may establish and maintain a set of rules or heuristics over which workload placement may be reasoned at run time. This may improve the flexibility of the system 100. Thus, interaction translation may allow for the translation of the user's actions that represent contextual information known to the user into a format understood by the optimization engine module 442, so the solution is agnostic to the optimization engine module 442 (or particular optimization algorithm in use) itself.

After translating the user input into user-defined rules for the optimization engine module 442, the method 900 loops back to block 906 to re-run the optimization algorithm. Thus, the management interface 104 may quickly incorporate dynamic user feedback into the behavior of the optimization algorithm. In addition to responding to user input, the method 900 may also respond to changes in the state of the system 100. The system state data may be polled or otherwise queried by the optimization engine module 442 on a regular, continual, or responsive basis to adjust to deviations from the current datacenter schedule. Connection to a continuously updating database of system state data may support monitoring of datacenter schedules and notification when deviations occur. In situations in which the datacenter schedule is deviated from (or the user defines a new goal and/or constraint as described above) the optimization engine module 442 may re-run and provide an updated datacenter schedule. Thus, the system 100 may overcome the issue of rapid obsolescence of the datacenter schedule.

EXAMPLES

Illustrative examples of the technologies disclosed herein are provided below. An embodiment of the technologies may include any one or more, and any combination of, the examples described below.

Example 1 includes a rack controller of a computing rack, the rack controller comprising a performance monitoring module to receive a metric associated with a hardware component of the computing rack, wherein the metric comprises a system metric, a performance metric, or a health metric; and an analytics module to determine a regression model for the hardware component based on the metric associated with the hardware component; determine a mean-time-to-failure value for the hardware component based on the regression model for the hardware component; and determine a mean-time-to-failure value for a logical machine based on the mean-time-to-failure value for the hardware component, wherein the logical machine is associated with the hardware component.

Example 2 includes the subject matter of Example 1, and wherein to receive the metric comprises to receive the metric from a metric component of the hardware component.

Example 3 includes the subject matter of any of Examples 1 and 2, and wherein the hardware component comprises a compute resource, a memory resource, a storage resource, or a network resource.

Example 4 includes the subject matter of any of Examples 1-3, and wherein to determine the regression model comprises to determine a linear regression model.

Example 5 includes the subject matter of any of Examples 1-4, and wherein to determine the regression model comprises to determine a non-linear regression model.

Example 6 includes the subject matter of any of Examples 1-5, and wherein to determine the mean-time-to-failure value for the hardware component comprises to determine a predicted metric associated with the hardware component based on the regression model; and compare the predicted metric to a predefined threshold metric.

Example 7 includes the subject matter of any of Examples 1-6, and wherein to determine the mean-time-to-failure value for the hardware component comprises to determine a predicted metric associated with the hardware component based on the regression model; determine a service level metric of a service level agreement associated with the hardware component; and compare the predicted metric to the service level metric.

Example 8 includes the subject matter of any of Examples 1-7, and further comprising a datacenter management module to notify a user of the mean-time-to-failure value for the hardware component.

Example 9 includes the subject matter of any of Examples 1-8, and further comprising a datacenter management module to determine a future time for a maintenance session associated with the logical machine based on the mean-time-to-failure value for the logical machine.

Example 10 includes the subject matter of any of Examples 1-9, and wherein the performance monitoring module is further to receive a performance indicator associated with a computing application assigned to the logical machine; and to determine the future time further comprises to determine the future time based on the performance indicator.

Example 11 includes the subject matter of any of Examples 1-10, and further comprising a datacenter management module to identify a plurality of hardware components of the computing rack, wherein the plurality of hardware components comprises the hardware component and wherein a mean-time-to-failure value associated with each of the hardware components is similar to the mean-time-to-failure value of the hardware component; and compose the logical machine to include the plurality of hardware components.

Example 12 includes a rack controller of a computing rack, the rack controller comprising an orchestration module to receive a description of a computing application executable by the computing rack; transmit the description of the computing application to a remote computing device; and receive predicted workload data associated with the application from the remote computing device in response to transmitting the description of the computing application, wherein the predicted workload data is indicative of a usage pattern of a hardware component of the computing rack; and a hardware failure prediction module to determine a probability of failure of the hardware component of the computing rack based on the predicted workload data.

Example 13 includes the subject matter of Example 12, and wherein the description of the computing application comprises a service template.

Example 14 includes the subject matter of any of Examples 12 and 13, and wherein the description is indicative of a structure or an initialization method of the computing application.

Example 15 includes the subject matter of any of Examples 12-14, and wherein the predicted workload data comprises an amplitude, frequency, or phase of a waveform indicative of load on the hardware component.

Example 16 includes the subject matter of any of Examples 12-15, and wherein the hardware component comprises a compute resource, a memory resource, a storage resource, or a network resource.

Example 17 includes the subject matter of any of Examples 12-16, and further comprising a scheduling module to identify available hardware components from a plurality of hardware components of the computing rack, wherein the available hardware components are available to execute the computing application; wherein the hardware failure prediction module is further to determine a probability of failure of each of the available hardware components based on the predicted workload data.

Example 18 includes the subject matter of any of Examples 12-17, and wherein the scheduling module is further to select an available hardware component from the available hardware components to execute the computing application as a function of the probability of failure of each of the available hardware components.

Example 19 includes the subject matter of any of Examples 12-18, and further comprising a service level agreement module to determine whether a service level agreement associated with the computing application is satisfied as a function of the probability of failure of the hardware component.

Example 20 includes the subject matter of any of Examples 12-19, and further comprising a performance monitoring module to receive a hardware performance metric associated with a second hardware component of the computing rack; determine historical workload data as a function of the hardware performance metric, wherein the historical workload data is indicative of a usage pattern of the second hardware component; associate an application description of a current application of the computing rack with the historical workload data; and transmit the historical workload data and the application description of the current application to the remote computing device.

Example 21 includes the subject matter of any of Examples 12-20, and wherein to receive the hardware performance metric comprises to receive the hardware performance metric from a metric component of the second hardware component.

Example 22 includes the subject matter of any of Examples 12-21, and wherein the historical workload data comprises an amplitude, frequency, or phase of a waveform indicative of load on the second hardware component.

Example 23 includes the subject matter of any of Examples 12-22, and wherein to determine the historical workload data comprises to determine the historical workload data using a Fourier transform of the hardware performance metric.

Example 24 includes the subject matter of any of Examples 12-23, and wherein the second hardware component comprises a compute resource, a memory resource, a storage resource, or a network resource.

Example 25 includes a computing device for performance data management, the computing device comprising a communication module to receive, from a first rack controller of a first computing rack, historical workload data and an associated description of a computing application executable by the first computing rack, wherein the historical workload data is indicative of a usage pattern of a hardware component of the first computing rack; and receive, from a second rack controller of a second computing rack, a description of the computing application; and an application performance database module to retrieve the historical workload data associated with the description of the computing application; wherein the communication module is further to transmit the historical workload data to the second rack controller.

Example 26 includes the subject matter of Example 25, and wherein the description of the computing application comprises a service template.

Example 27 includes the subject matter of any of Examples 25 and 26, and wherein the description is indicative of a structure or an initialization method of the computing application.

Example 28 includes the subject matter of any of Examples 25-27, and wherein to retrieve the historical workload data associated with the description of the computing application comprises to determine whether historical workload data associated with the description of the computing application exists; retrieve the historical workload data associated with the description of the computing application in response to a determination that the historical workload data associated with the description of the computing application exists; and estimate the historical workload data associated with the description of the computing application in response to a determination that historical workload data associated with the description of the computing application does not exist.

Example 29 includes the subject matter of any of Examples 25-28, and wherein to estimate the historical workload data comprises to estimate the historical workload data based on historical workload data associated with a second computing application, wherein the second computing application is similar to the computing application.

Example 30 includes the subject matter of any of Examples 25-29, and wherein the application performance database module is further to replace estimated workload data associated with the computing application with the historical workload data associated with the computing application in response to receipt of the historical workload data and the associated description of the computing application.

Example 31 includes a management interface for datacenter workload optimization, the management interface comprising an interactive visualization module to (i) generate an interactive visualization representative of a system state of the datacenter and (ii) receive human input responsive to the interactive visualization; an interaction translation module to translate the human input into a machine-readable rule for optimizing workload scheduling of the datacenter; and an optimization engine module to optimize a datacenter schedule of the datacenter based on the machine-readable rule.

Example 32 includes the subject matter of Example 31, and wherein the optimization engine module is further to determine a predefined rule for optimization of workload scheduling of the datacenter; and to optimize the datacenter schedule further comprises to optimize the datacenter schedule of the datacenter based on the predefined rule.

Example 33 includes the subject matter of any of Examples 31 and 32, and wherein to determine the predefined rule comprises to determine the predefined rule based on a service level agreement associated with the datacenter.

Example 34 includes the subject matter of any of Examples 31-33, and further comprising a system state module to receive sensor data from a plurality of sensors of the datacenter, wherein the sensor data is indicative of the system state of the datacenter; wherein to generate the interactive visualization comprises to generate the interactive visualization in response to receipt of the sensor data.

Example 35 includes the subject matter of any of Examples 31-34, and wherein the optimization engine module is further to adjust the system state of the datacenter based on the datacenter schedule in response to optimization of the datacenter scheduler; and the interactive visualization module is further to update the interactive visualization representative of the system state of the datacenter in response to adjustment of the system state of the datacenter.

Example 36 includes a method for datacenter management, the method comprising receiving, by a rack controller of a computing rack, a metric associated with a hardware component of the computing rack, wherein the metric comprises a system metric, a performance metric, or a health metric; determining, by the rack controller, a regression model for the hardware component based on the metric associated with the hardware component; determining, by the rack controller, a mean-time-to-failure value for the hardware component based on the regression model for the hardware component; and determining, by the rack controller, a mean-time-to-failure value for a logical machine based on the mean-time-to-failure value for the hardware component, wherein the logical machine is associated with the hardware component.

Example 37 includes the subject matter of Example 36, and wherein receiving the metric comprises receiving the metric from a metric component of the hardware component.

Example 38 includes the subject matter of any of Examples 36 and 37, and wherein the hardware component comprises a compute resource, a memory resource, a storage resource, or a network resource.

Example 39 includes the subject matter of any of Examples 36-38, and wherein determining the regression model comprises determining a linear regression model.

Example 40 includes the subject matter of any of Examples 36-39, and wherein determining the regression model comprises determining a non-linear regression model.

Example 41 includes the subject matter of any of Examples 36-40, and wherein determining the mean-time-to-failure value for the hardware component comprises determining a predicted metric associated with the hardware component based on the regression model; and comparing the predicted metric to a predefined threshold metric.

Example 42 includes the subject matter of any of Examples 36-41, and wherein determining the mean-time-to-failure value for the hardware component comprises determining a predicted metric associated with the hardware component based on the regression model; determining a service level metric of a service level agreement associated with the hardware component; and comparing the predicted metric to the service level metric.

Example 43 includes the subject matter of any of Examples 36-42, and further comprising notifying, by the rack controller, a user of the mean-time-to-failure value for the hardware component.

Example 44 includes the subject matter of any of Examples 36-43, and further comprising determining, by the rack controller, a future time for a maintenance session associated with the logical machine based on the mean-time-to-failure value for the logical machine.

Example 45 includes the subject matter of any of Examples 36-44, and further comprising receiving, by the rack controller, a performance indicator associated with a computing application assigned to the logical machine; wherein determining the future time further comprises determining the future time based on the performance indicator.

Example 46 includes the subject matter of any of Examples 36-45, and further comprising identifying, by the rack controller, a plurality of hardware components of the computing rack, wherein the plurality of hardware components comprises the hardware component and wherein a mean-time-to-failure value associated with each of the hardware components is similar to the mean-time-to-failure value of the hardware component; and composing, by the rack controller, the logical machine to include the plurality of hardware components.

Example 47 includes a method for optimizing datacenter scheduling, the method comprising receiving, by a rack controller of a computing rack, a description of a computing application executable by the computing rack; transmitting, by the rack controller, the description of the computing application to a remote computing device; receiving, by the rack controller, predicted workload data associated with the application from the remote computing device in response to transmitting the description of the computing application, wherein the predicted workload data is indicative of a usage pattern of a hardware component of the computing rack; and determining, by the rack controller, a probability of failure of the hardware component of the computing rack based on the predicted workload data.

Example 48 includes the subject matter of Example 47, and wherein the description of the computing application comprises a service template.

Example 49 includes the subject matter of any of Examples 47 and 48, and wherein the description is indicative of a structure or an initialization method of the computing application.

Example 50 includes the subject matter of any of Examples 47-49, and wherein the predicted workload data comprises an amplitude, frequency, or phase of a waveform indicative of load on the hardware component.

Example 51 includes the subject matter of any of Examples 47-50, and wherein the hardware component comprises a compute resource, a memory resource, a storage resource, or a network resource.

Example 52 includes the subject matter of any of Examples 47-51 and further comprising identifying, by the rack controller, available hardware components from a plurality of hardware components of the computing rack, wherein the available hardware components are available to execute the computing application; and determining, by the rack controller, a probability of failure of each of the available hardware components based on the predicted workload data.

Example 53 includes the subject matter of any of Examples 47-52, and further comprising selecting, by the rack controller, an available hardware component from the available hardware components to execute the computing application as a function of the probability of failure of each of the available hardware components.

Example 54 includes the subject matter of any of Examples 47-53, and further comprising determining, by the rack controller, whether a service level agreement associated with the computing application is satisfied as a function of the probability of failure of the hardware component.

Example 55 includes the subject matter of any of Examples 47-54, and further comprising receiving, by the rack controller, a hardware performance metric associated with a second hardware component of the computing rack; determining, by the rack controller, historical workload data as a function of the hardware performance metric, wherein the historical workload data is indicative of a usage pattern of the second hardware component; associating, by the rack controller, an application description of a current application of the computing rack with the historical workload data; and transmitting, by the rack controller, the historical workload data and the application description of the current application to the remote computing device.

Example 56 includes the subject matter of any of Examples 47-55, and wherein receiving the hardware performance metric comprises receiving the hardware performance metric from a metric component of the second hardware component.

Example 57 includes the subject matter of any of Examples 47-56, and wherein the historical workload data comprises an amplitude, frequency, or phase of a waveform indicative of load on the second hardware component.

Example 58 includes the subject matter of any of Examples 47-57, and wherein determining the historical workload data comprises determining the historical workload data using a Fourier transform of the hardware performance metric.

Example 59 includes the subject matter of any of Examples 47-58, and wherein the second hardware component comprises a compute resource, a memory resource, a storage resource, or a network resource.

Example 60 includes a method for performance data management, the method comprising receiving, by a computing device from a first rack controller of a first computing rack, historical workload data and an associated description of a computing application executable by the first computing rack, wherein the historical workload data is indicative of a usage pattern of a hardware component of the first computing rack; receiving, by the computing device from a second rack controller of a second computing rack, a description of the computing application; retrieving, by the computing device, the historical workload data associated with the description of the computing application; and transmitting, by the computing device, the historical workload data to the second rack controller.

Example 61 includes the subject matter of Example 60, and wherein the description of the computing application comprises a service template.

Example 62 includes the subject matter of any of Examples 60 and 61, and wherein the description is indicative of a structure or an initialization method of the computing application.

Example 63 includes the subject matter of any of Examples 60-62, and wherein retrieving the historical workload data associated with the description of the computing application comprises determining whether historical workload data associated with the description of the computing application exists; retrieving the historical workload data associated with the description of the computing application in response to determining that the historical workload data associated with the description of the computing application exists; and estimating the historical workload data associated with the description of the computing application in response to determining that historical workload data associated with the description of the computing application does not exist.

Example 64 includes the subject matter of any of Examples 60-63, and wherein estimating the historical workload data comprises estimating the historical workload data based on historical workload data associated with a second computing application, wherein the second computing application is similar to the computing application.

Example 65 includes the subject matter of any of Examples 60-64, and further comprising replacing, by the computing device, estimated workload data associated with the computing application with the historical workload data associated with the computing application in response to receiving the historical workload data and the associated description of the computing application.

Example 66 includes a method for datacenter workload optimization, the method comprising generating, by a management interface, an interactive visualization representative of a system state of the datacenter; receiving, by the management interface, human input responsive to the interactive visualization; translating, by the management interface, the human input into a machine-readable rule for optimizing workload scheduling of the datacenter; and optimizing, by the management interface, a datacenter schedule of the datacenter based on the machine-readable rule.

Example 67 includes the subject matter of Example 66, and further comprising determining, by the management interface, a predefined rule for optimizing workload scheduling of the datacenter; wherein optimizing the datacenter schedule further comprises optimizing the datacenter schedule of the datacenter based on the predefined rule.

Example 68 includes the subject matter of any of Examples 66 and 67, and wherein determining the predefined rule comprises determining the predefined rule based on a service level agreement associated with the datacenter.

Example 69 includes the subject matter of any of Examples 66-68, and further comprising receiving, by the management interface, sensor data from a plurality of sensors of the datacenter, wherein the sensor data is indicative of the system state of the datacenter; wherein generating the interactive visualization comprises generating the interactive visualization in response to receiving the sensor data.

Example 70 includes the subject matter of any of Examples 66-69, and further comprising adjusting, by the management interface, the system state of the datacenter based on the datacenter schedule in response to optimizing the datacenter scheduler; and updating, by the management interface, the interactive visualization representative of the system state of the datacenter in response to adjusting the system state of the datacenter.

Example 71 includes a computing device comprising a processor; and a memory having stored therein a plurality of instructions that when executed by the processor cause the computing device to perform the method of any of Examples 36-70.

Example 72 includes one or more machine readable storage media comprising a plurality of instructions stored thereon that in response to being executed result in a computing device performing the method of any of Examples 36-70.

Example 73 includes a computing device comprising means for performing the method of any of Examples 36-70.

Example 74 includes a rack controller of a computing rack, the rack controller comprising means for receiving a metric associated with a hardware component of the computing rack, wherein the metric comprises a system metric, a performance metric, or a health metric; means for determining a regression model for the hardware component based on the metric associated with the hardware component; means for determining a mean-time-to-failure value for the hardware component based on the regression model for the hardware component; and means for determining a mean-time-to-failure value for a logical machine based on the mean-time-to-failure value for the hardware component, wherein the logical machine is associated with the hardware component.

Example 75 includes the subject matter of Example 74, and wherein the means for receiving the metric comprises means for receiving the metric from a metric component of the hardware component.

Example 76 includes the subject matter of any of Examples 74 and 75, and wherein the hardware component comprises a compute resource, a memory resource, a storage resource, or a network resource.

Example 77 includes the subject matter of any of Examples 74-76, and wherein the means for determining the regression model comprises means for determining a linear regression model.

Example 78 includes the subject matter of any of Examples 74-77, and wherein the means for determining the regression model comprises means for determining a non-linear regression model.

Example 79 includes the subject matter of any of Examples 74-78, and wherein the means for determining the mean-time-to-failure value for the hardware component comprises means for determining a predicted metric associated with the hardware component based on the regression model; and means for comparing the predicted metric to a predefined threshold metric.

Example 80 includes the subject matter of any of Examples 74-79, and wherein the means for determining the mean-time-to-failure value for the hardware component comprises means for determining a predicted metric associated with the hardware component based on the regression model; means for determining a service level metric of a service level agreement associated with the hardware component; and means for comparing the predicted metric to the service level metric.

Example 81 includes the subject matter of any of Examples 74-80, and further comprising means for notifying a user of the mean-time-to-failure value for the hardware component.

Example 82 includes the subject matter of any of Examples 74-81, and further comprising means for determining a future time for a maintenance session associated with the logical machine based on the mean-time-to-failure value for the logical machine.

Example 83 includes the subject matter of any of Examples 74-82, and further comprising: means for receiving a performance indicator associated with a computing application assigned to the logical machine; wherein the means for determining the future time further comprises means for determining the future time based on the performance indicator.

Example 84 includes the subject matter of any of Examples 74-83, and further comprising: means for identifying a plurality of hardware components of the computing rack, wherein the plurality of hardware components comprises the hardware component and wherein a mean-time-to-failure value associated with each of the hardware components is similar to the mean-time-to-failure value of the hardware component; and means for composing the logical machine to include the plurality of hardware components.

Example 85 includes a rack controller of a computing rack, the rack controller comprising means for receiving a description of a computing application executable by the computing rack; means for transmitting the description of the computing application to a remote computing device; means for receiving predicted workload data associated with the application from the remote computing device in response to transmitting the description of the computing application, wherein the predicted workload data is indicative of a usage pattern of a hardware component of the computing rack; and means for determining a probability of failure of the hardware component of the computing rack based on the predicted workload data.

Example 86 includes the subject matter of Example 85, and wherein the description of the computing application comprises a service template.

Example 87 includes the subject matter of any of Examples 85 and 86, and wherein the description is indicative of a structure or an initialization rack controller of the computing application.

Example 88 includes the subject matter of any of Examples 85-87, and wherein the predicted workload data comprises an amplitude, frequency, or phase of a waveform indicative of load on the hardware component.

Example 89 includes the subject matter of any of Examples 85-88, and wherein the hardware component comprises a compute resource, a memory resource, a storage resource, or a network resource.

Example 90 includes the subject matter of any of Examples 85-89, and further comprising means for identifying available hardware components from a plurality of hardware components of the computing rack, wherein the available hardware components are available to execute the computing application; and means for determining a probability of failure of each of the available hardware components based on the predicted workload data.

Example 91 includes the subject matter of any of Examples 85-90, and further comprising means for selecting an available hardware component from the available hardware components to execute the computing application as a function of the probability of failure of each of the available hardware components.

Example 92 includes the subject matter of any of Examples 85-91, and further comprising means for determining whether a service level agreement associated with the computing application is satisfied as a function of the probability of failure of the hardware component.

Example 93 includes the subject matter of any of Examples 85-92, and further comprising means for receiving a hardware performance metric associated with a second hardware component of the computing rack; means for determining historical workload data as a function of the hardware performance metric, wherein the historical workload data is indicative of a usage pattern of the second hardware component; means for associating an application description of a current application of the computing rack with the historical workload data; and means for transmitting the historical workload data and the application description of the current application to the remote computing device.

Example 94 includes the subject matter of any of Examples 85-93, and wherein the means for receiving the hardware performance metric comprises means for receiving the hardware performance metric from a metric component of the second hardware component.

Example 95 includes the subject matter of any of Examples 85-94, and wherein the historical workload data comprises an amplitude, frequency, or phase of a waveform indicative of load on the second hardware component.

Example 96 includes the subject matter of any of Examples 85-95, and wherein the means for determining the historical workload data comprises means for determining the historical workload data using a Fourier transform of the hardware performance metric.

Example 97 includes the subject matter of any of Examples 85-96, and wherein the second hardware component comprises a compute resource, a memory resource, a storage resource, or a network resource.

Example 98 includes a computing device for performance data management, the computing device comprising means for receiving, from a first rack controller of a first computing rack, historical workload data and an associated description of a computing application executable by the first computing rack, wherein the historical workload data is indicative of a usage pattern of a hardware component of the first computing rack; means for receiving, from a second rack controller of a second computing rack, a description of the computing application; means for retrieving the historical workload data associated with the description of the computing application; and means for transmitting the historical workload data to the second rack controller.

Example 99 includes the subject matter of Example 98, and wherein the description of the computing application comprises a service template.

Example 100 includes the subject matter of any of Examples 98 and 99, and wherein the description is indicative of a structure or an initialization method of the computing application.

Example 101 includes the subject matter of any of Examples 98-100, and wherein the means for retrieving the historical workload data associated with the description of the computing application comprises means for determining whether historical workload data associated with the description of the computing application exists; means for retrieving the historical workload data associated with the description of the computing application in response to determining that the historical workload data associated with the description of the computing application exists; and means for estimating the historical workload data associated with the description of the computing application in response to determining that historical workload data associated with the description of the computing application does not exist.

Example 102 includes the subject matter of any of Examples 98-101, and wherein the means for estimating the historical workload data comprises means for estimating the historical workload data based on historical workload data associated with a second computing application, wherein the second computing application is similar to the computing application.

Example 103 includes the subject matter of any of Examples 98-102, and further comprising means for replacing estimated workload data associated with the computing application with the historical workload data associated with the computing application in response to receiving the historical workload data and the associated description of the computing application.

Example 104 includes a management interface for datacenter workload optimization, the management interface comprising means for generating an interactive visualization representative of a system state of the datacenter; means for receiving human input responsive to the interactive visualization; means for translating the human input into a machine-readable rule for optimizing workload scheduling of the datacenter; and means for optimizing a datacenter schedule of the datacenter based on the machine-readable rule.

Example 105 includes the subject matter of Example 104, and further comprising: means for determining a predefined rule for optimizing workload scheduling of the datacenter; wherein the means for optimizing the datacenter schedule further comprises means for optimizing the datacenter schedule of the datacenter based on the predefined rule.

Example 106 includes the subject matter of any of Examples 104 and 105, and wherein the means for determining the predefined rule comprises means for determining the predefined rule based on a service level agreement associated with the datacenter.

Example 107 includes the subject matter of any of Examples 104-106, and further comprising means for receiving sensor data from a plurality of sensors of the datacenter, wherein the sensor data is indicative of the system state of the datacenter; wherein the means for generating the interactive visualization comprises means for generating the interactive visualization in response to receiving the sensor data.

Example 108 includes the subject matter of any of Examples 104-107, and further comprising means for adjusting the system state of the datacenter based on the datacenter schedule in response to optimizing the datacenter scheduler; and means for updating the interactive visualization representative of the system state of the datacenter in response to adjusting the system state of the datacenter.

What is claimed is:

1. A rack controller of a computing rack, the rack controller comprising:
   a processor; and
   a memory storing a plurality of instructions, which, when executed on the processor, causes the rack controller to:
   receive a metric associated with a hardware component of the computing rack, the hardware component managed by the rack controller, wherein the metric comprises a system metric, a performance metric, or a health metric;
   determine a regression model for the hardware component based on the metric associated with the hardware component;
   determine a mean-time-to-failure (MTTF) value for the hardware component, wherein to determine the MTTF value comprises to (i) determine a predicted metric associated with the hardware component based on the regression model for the hardware component, (ii) determine a service level metric of a service level agreement associated with the hardware component, and (iii) compare the predicted metric with the service level metric to obtain a distance to a point in time in which the predicted metric and the service level metric intersect; and
   compose a logical machine including the hardware component and a plurality of second hardware components of the computing rack, each of the plurality of second hardware components managed by the rack controller, wherein the plurality of second hardware components is of compute, storage, network, and memory resources each associated with a MTTF value that is associated with a same scheduled maintenance session as the MTTF value for the hardware component.

2. The rack controller of claim 1, wherein to receive the metric comprises to receive the metric from a metric component of the hardware component.

3. The rack controller of claim 1, wherein the hardware component comprises a compute resource, a memory resource, a storage resource, or a network resource.

4. The rack controller of claim 1, wherein to determine the regression model comprises to determine a linear regression model.

5. The rack controller of claim 1, wherein to determine the regression model comprises to determine a non-linear regression model.

6. The rack controller of claim 1, wherein to determine the MTTF value for the hardware component comprises to:
   determine a predicted metric associated with the hardware component based on the regression model; and
   compare the predicted metric to a corresponding one of the one or more predefined threshold metrics.

7. The rack controller of claim 1, wherein the plurality of instructions further causes the rack controller to notify a user of the MTTF value for the hardware component.

8. The rack controller of claim 1, wherein the plurality of instructions further causes the rack controller to determine a future time for a maintenance session associated with the logical machine based on a MTTF value for the logical machine.

9. The rack controller of claim 8, wherein the plurality of instructions further causes the rack controller to receive a performance indicator associated with a computing application assigned to the logical machine and wherein to determine the future time further comprises to determine the future time based on the performance indicator.

10. A method for datacenter management, the method comprising:
receiving, by a rack controller of a computing rack, a metric associated with a hardware component of the computing rack, wherein the metric comprises a system metric, a performance metric, or a health metric, and wherein the hardware component is managed by the rack controller;
determining, by the rack controller, a regression model for the hardware component based on the metric associated with the hardware component;
determining, by the rack controller, a mean-time-to-failure (MTTF) value for the hardware component, wherein determining the MTTF value comprises (i) determining a predicted metric associated with the hardware component based on the regression model for the hardware component, (ii) determining a service level metric of a service level agreement associated with the hardware component, and (iii) comparing the predicted metric with the service level metric to obtain a distance to a point in time in which the predicted metric and the service level metric intersect; and
composing, by the rack controller, a logical machine including the hardware component and a plurality of second hardware components of the computing rack, each of the plurality of second hardware components managed by the rack controller, wherein the plurality of second hardware components is of compute, storage, network, and memory resources each associated with a MTTF value that is associated with a same scheduled maintenance session as the MTTF value for the hardware component.

11. The method of claim 10, wherein receiving the metric comprises receiving the metric from a metric component of the hardware component.

12. The method of claim 10, wherein determining the MTTF value for the hardware component comprises:
determining a predicted metric associated with the hardware component based on the regression model; and
comparing the predicted metric to a corresponding one of the one or more predefined threshold metrics.

13. The method of claim 10, further comprising determining, by the rack controller, a future time for a maintenance session associated with the logical machine based on a MTTF value for the logical machine.

14. The method of claim 13, further comprising:
receiving, by the rack controller, a performance indicator associated with a computing application assigned to the logical machine;
wherein determining the future time further comprises determining the future time based on the performance indicator.

15. One or more non-transitory computer-readable storage media comprising a plurality of instructions that in response to being executed cause a rack controller of a computing rack to:
receive a metric associated with a hardware component of the computing rack, the hardware component managed by the rack controller, wherein the metric comprises a system metric, a performance metric, or a health metric;
determine a regression model for the hardware component based on the metric associated with the hardware component;
determine a mean-time-to-failure (MTTF) value for the hardware component, wherein to determine the MTTF value comprises to (i) determine a predicted metric associated with the hardware component based on the regression model for the hardware component, (ii) determine a service level metric of a service level agreement associated with the hardware component, and (iii) compare the predicted metric with the service level metric to obtain a distance to a point in time in which the predicted metric and the service level metric intersect; and
compose a logical machine including the hardware component and a plurality of second hardware components of the computing rack, each of the plurality of second hardware components managed by the rack controller, wherein the plurality of second hardware components is associated with a MTTF value that is associated with a same scheduled maintenance session as the MTTF value for the hardware component.

16. The one or more non-transitory computer-readable storage media of claim 15, wherein to receive the metric comprises to receive the metric from a metric component of the hardware component.

17. The one or more non-transitory computer-readable storage media of claim 15, wherein to determine the MTTF value for the hardware component comprises to:
determine a predicted metric associated with the hardware component based on the regression model; and
compare the predicted metric to a predefined corresponding one of the one or more predefined threshold metrics.

18. The one or more non-transitory computer-readable storage media of claim 15, wherein the plurality of instructions further causes the rack controller to determine a future time for a maintenance session associated with the logical machine based on a MTTF value for the logical machine.

19. The one or more non-transitory computer-readable storage media of claim 18, wherein the plurality of instructions further causes the rack controller to:
receive a performance indicator associated with a computing application assigned to the logical machine;
wherein to determine the future time further comprises to determine the future time based on the performance indicator.

* * * * *